United States Patent
Naguchi

(10) Patent No.: US 10,178,014 B2
(45) Date of Patent: Jan. 8, 2019

(54) FILE SYSTEM, CONTROL PROGRAM OF FILE SYSTEM MANAGEMENT DEVICE, AND METHOD OF CONTROLLING FILE SYSTEM

(71) Applicant: FUJITSU LIMITED, Kawasaki-shi, Kanagawa (JP)

(72) Inventor: Yoshinori Naguchi, Bunkyou (JP)

(73) Assignee: FUJITSU LIMITED, Kawasaki (JP)

( * ) Notice: Subject to any disclaimer, the term of this patent is extended or adjusted under 35 U.S.C. 154(b) by 53 days.

(21) Appl. No.: 14/874,644

(22) Filed: Oct. 5, 2015

(65) Prior Publication Data

US 2016/0105352 A1   Apr. 14, 2016

(30) Foreign Application Priority Data

Oct. 9, 2014   (JP) .................................. 2014-207849

(51) Int. Cl.
G06F 9/50       (2006.01)
G06F 17/30      (2006.01)
(Continued)

(52) U.S. Cl.
CPC .............. H04L 43/50 (2013.01); G06F 9/505 (2013.01); G06F 17/30194 (2013.01);
(Continued)

(58) Field of Classification Search
CPC ............... H04L 29/08072; H04L 29/06; H04L 29/0809; H04L 63/08; H04L 63/102;
(Continued)

(56) References Cited

U.S. PATENT DOCUMENTS

2003/0110263 A1   6/2003   Shillo
2004/0215792 A1*  10/2004  Koning ................... G06F 9/505
                                                  709/229
(Continued)

FOREIGN PATENT DOCUMENTS

EP   2 651 101 A1    10/2013
JP   2004-334561     11/2004
(Continued)

OTHER PUBLICATIONS

Office Action dated Apr. 24, 2018, in corresponding Japanese Patent Application No. 2014-207849.
(Continued)

*Primary Examiner* — Mahran Y Abu Roumi
(74) *Attorney, Agent, or Firm* — Staas & Halsey LLP

(57) ABSTRACT

A file system includes a plurality of information-processing-devices, a plurality of storage devices and a management device, each connected to a communications network, wherein each information processing devices includes a transmission unit for transmitting state information indicating utilization state of the communications network by the information-processing-device to the management device, and the management device includes a determination unit for determining an information-processing-device to execute an inputted job, and a first storage device, and further determine a first path in the communications network for the information-processing-device to access to the first storage device, a collection unit for collecting the state information, and an alteration unit configured to identify, based on the collected state information, a second storage device enhancing access efficiency and a second path in the communications network enhancing access efficiency, and alter the first storage device and the first path to the second storage device and the second path.

4 Claims, 16 Drawing Sheets

(51) Int. Cl.
*H04L 12/26* (2006.01)
*H04L 29/08* (2006.01)

(52) U.S. Cl.
CPC ........ *H04L 43/065* (2013.01); *H04L 43/0888* (2013.01); *H04L 67/1097* (2013.01); *G06F 2209/501* (2013.01)

(58) Field of Classification Search
CPC ..... H04L 43/00; H04L 12/2602; H04L 41/22; H04L 45/28; H04L 45/22; H04L 45/00; H04L 29/14; H04L 12/2422
USPC .......................................................... 709/229
See application file for complete search history.

(56) References Cited

U.S. PATENT DOCUMENTS

| | | | |
|---|---|---|---|
| 2004/0225662 A1 | 11/2004 | Nojima | |
| 2008/0219167 A1* | 9/2008 | Xu | H04L 47/10 370/237 |
| 2012/0151042 A1* | 6/2012 | Garg | H04L 65/4084 709/224 |
| 2014/0032839 A1 | 1/2014 | Konishi | |
| 2014/0050078 A1* | 2/2014 | Sato | H04L 41/0654 370/228 |
| 2014/0334292 A1* | 11/2014 | Chang | H04W 24/04 370/225 |

FOREIGN PATENT DOCUMENTS

| | | |
|---|---|---|
| JP | 2005-512232 | 4/2005 |
| JP | 2014-26529 | 2/2014 |

OTHER PUBLICATIONS

Extended European Search Report dated Feb. 16, 2016 in corresponding European Patent Application No. 15188124.0.

* cited by examiner

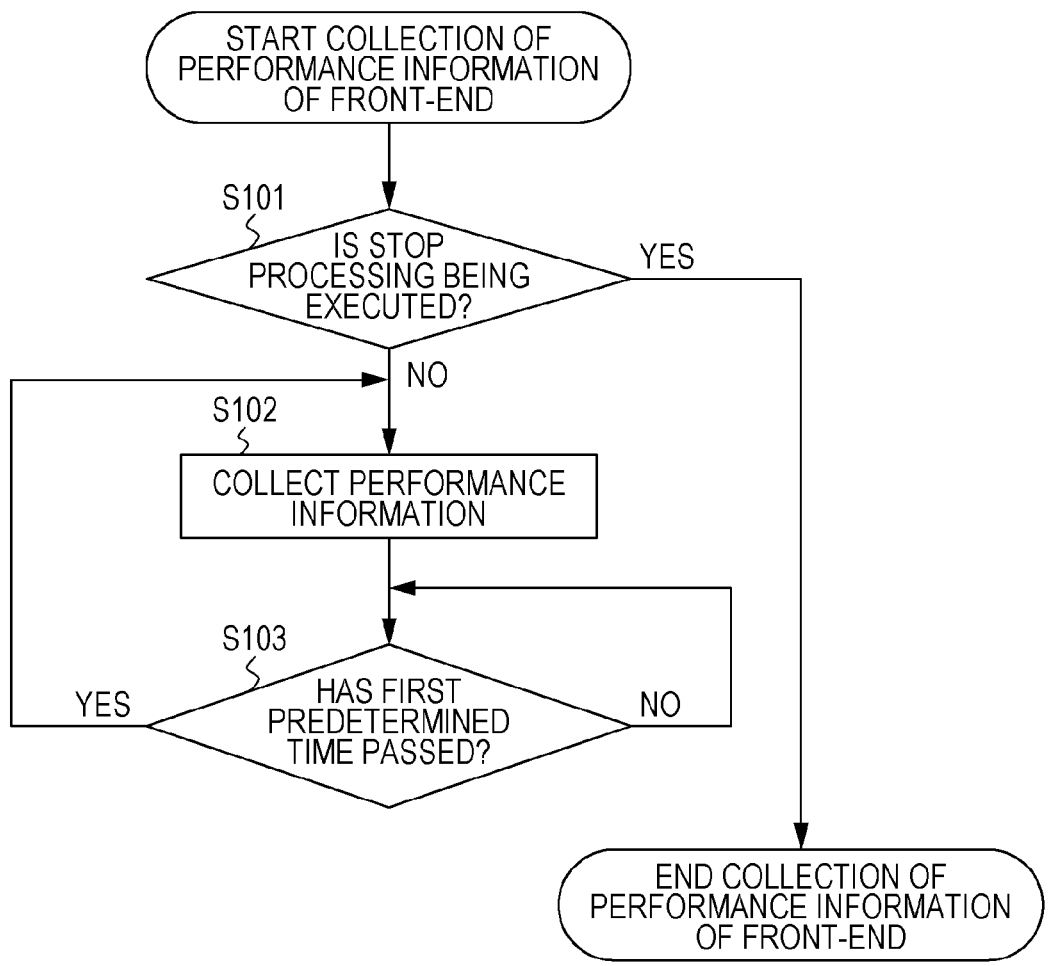

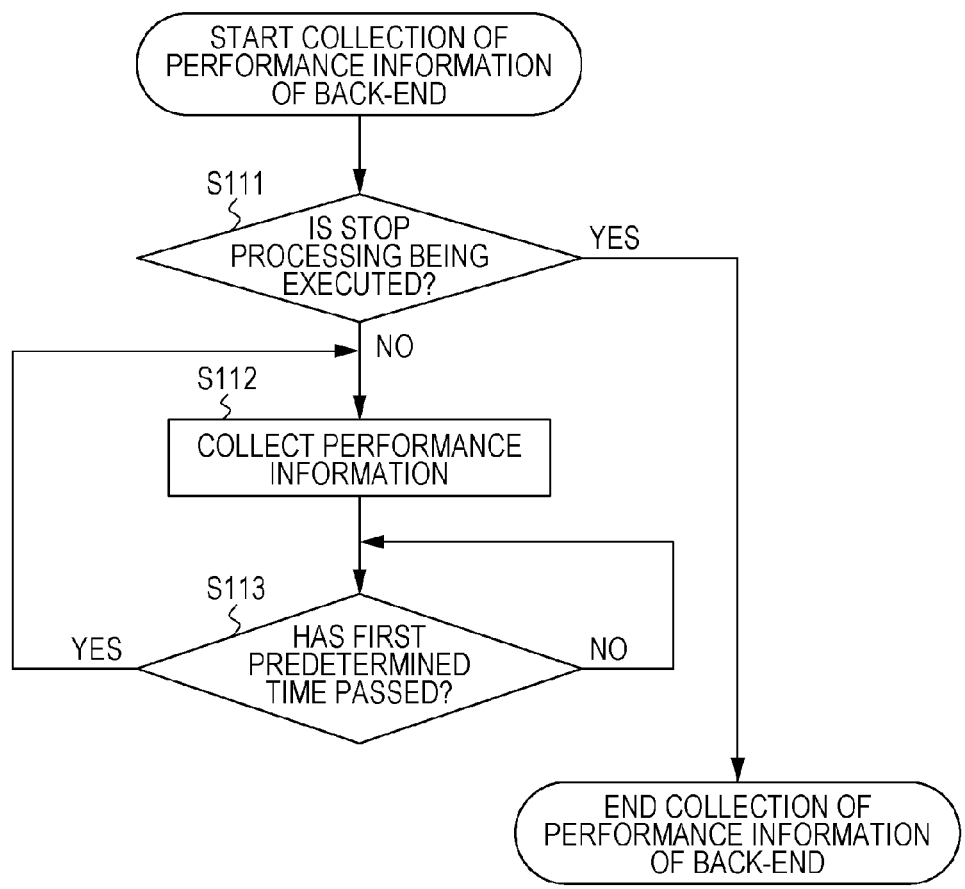

FIG. 15

| | GROUP IDENTIFIER | FRONT-END/BACK-END IDENTIFIER | TYPE IDENTIFIER | PERFORMANCE INFORMATION (UNIT: MiB/S) |
|---|---|---|---|---|
| | ... | ... | ... | ... |
| LN1 → | Ga | FE2a | NET | 100 |
| | Ga | FE3a | NET | 20 |
| LN2 → | Ga | BE1a | FS | 20 |
| | Gb | FE3b | NET | 20 |
| | Gb | BE1b | FS | 100 |
| | ... | ... | ... | ... |

| | GROUP IDENTIFIER | FRONT-END/BACK-END IDENTIFIER | TYPE IDENTIFIER | PERFORMANCE INFORMATION (UNIT: MiB/S) |
|---|---|---|---|---|
| | ... | ... | ... | ... |
| LN1 → | Ga | FE2a | NET | 100 |
| LN3 → | Ga | FE3a | NET | 80 |
| LN2 → | Ga | BE1a | FS | 80 |
| LN4 → | Gb | FE3b | NET | 100 |
| LN5 → | Gb | BE1b | FS | 100 |
| | ... | ... | ... | ... |

T4

FILE SYSTEM, CONTROL PROGRAM OF FILE SYSTEM MANAGEMENT DEVICE, AND METHOD OF CONTROLLING FILE SYSTEM

CROSS-REFERENCE TO RELATED APPLICATION

This application is based upon and claims the benefit of priority of the prior Japanese Patent Application No. 2014-207849, filed on Oct. 9, 2014, the entire contents of which are incorporated herein by reference.

FIELD

The embodiment discussed herein is related to a file system, a control program of a file system management device, and a method of controlling the file system.

BACKGROUND

A system is proposed that connects multiple information processing devices and multiple mass storage devices to a network, and stores data in the mass storage devices.

When a user instructs the system to execute information processing, a management device managing the system responds to the instruction and determines an information processing device to execute the information processing out of the multiple information processing devices within the system. Further, the management device determines, out of the multiple mass storage devices within the system, a mass storage device that stores data to be created by execution of the information processing, and data to be used for execution of the information processing. Then, the management device causes the determined information processing device to execute the information processing. The determined information processing device stores the data to be created by execution of the information processing into the determined mass storage device, or reads the data to be used for execution of the information processing from the determined mass storage device. Related techniques are disclosed in, for example, Japanese Laid-open Patent Publication No. 2004-334561, and Japanese National Publication of International Patent Application No. 2005-512232.

In the above-mentioned system, throughput of the system may drop, for example, due to delay in the network communication. In particular, when multiple information processings are executed concurrently in the system, load to the network increases. Increase of load to the network causes a delay in the network communication and thereby throughput of the system drops. To suppress the drop of system throughput, it is preferable to optimally manage the system throughput.

An aspect of the embodiment has an object to optimize throughput of a system that includes multiple information processing devices and multiple storage devices connected to a network.

SUMMARY

According to an aspect of the invention, an file system includes a plurality of information processing devices, a plurality of storage devices and a management device, each connected to a communications network, wherein each information processing devices includes a transmission unit configured to transmit state information indicating utilization state of the communications network by the information processing device to the management device, and the management device includes a determination unit configured to determine an information processing device to execute an inputted job, and a first storage device to store data accessed by execution of the job, and further determine a first path in the communications network for the information processing device to access to the first storage device, a collection unit configured to collect the state information, and an alteration unit configured to identify, based on the collected state information, a second storage device enhancing access efficiency by the determined information processing device, and a second path in the communications network enhancing access efficiency by the determined information processing device to the second storage device, and alter the first storage device and the first path to the second storage device and the second path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a flowchart illustrating collection of performance information executed by the front-end FE;

FIG. 11 is a table for storing performance information of the front-end FE;

FIG. 12 is a flowchart illustrating collection of performance information executed by the back-end BE;

FIG. 13 is a table for storing performance information of the back-end BE;

FIG. 15 is a table for storing performance information collected by the job manager MGR;

FIG. 18 is a table for storing performance information collected after resources have been recombined by optimizing the access path.

DESCRIPTION OF EMBODIMENT

[Information Processing System]

Figure 1:
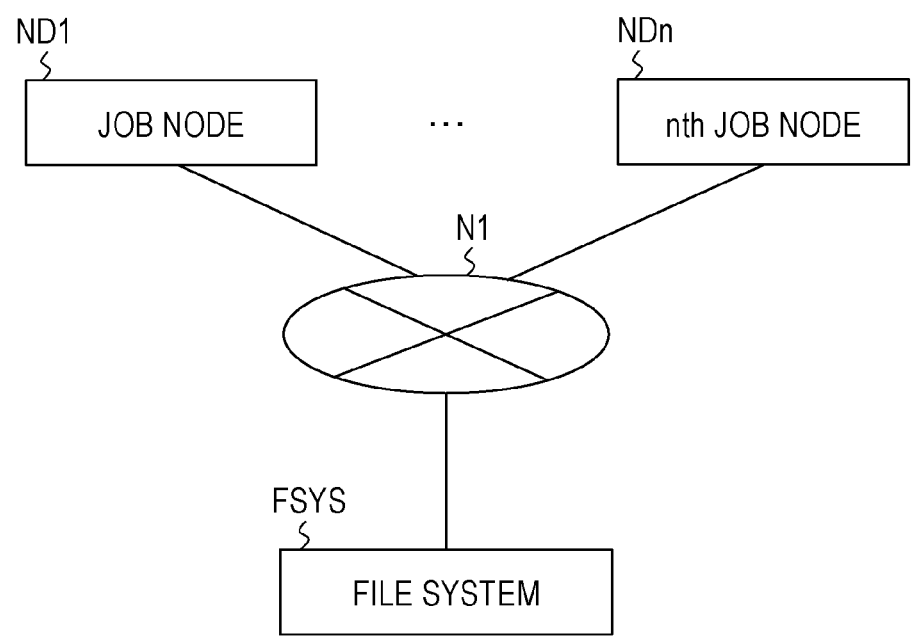
FIG. 1 is a block diagram illustrating an information processing system according to this embodiment.

FIG. 1 is a block diagram illustrating an information processing system according to this embodiment. In the following description of drawings, the same element is assigned with the same reference sign, and thereby description of the once described element is omitted.

An information processing system ISYS includes a first job node ND1 to an nth (n is an integer of two or larger) job node NDn and a file system FSYS. The first job node ND1 to the nth job node NDn and the file system FSYS are connected to a network N1. The file system FSYS is, for example, a large-scale distributed file system. The network N1 is, for example, a local area network (LAN).

The first job node ND1 to the nth job node NDn are terminals operated by a user of the information processing system ISYS (hereinafter referred to as a user as appropriate). In the following description of the job node, functions of the job node are described by using the first job node ND1 as an example. However, the other job nodes also include the same functions as the first job node ND1. A dotted line in FIG. 1 schematically indicates that job nodes are omitted.

Figure 2:
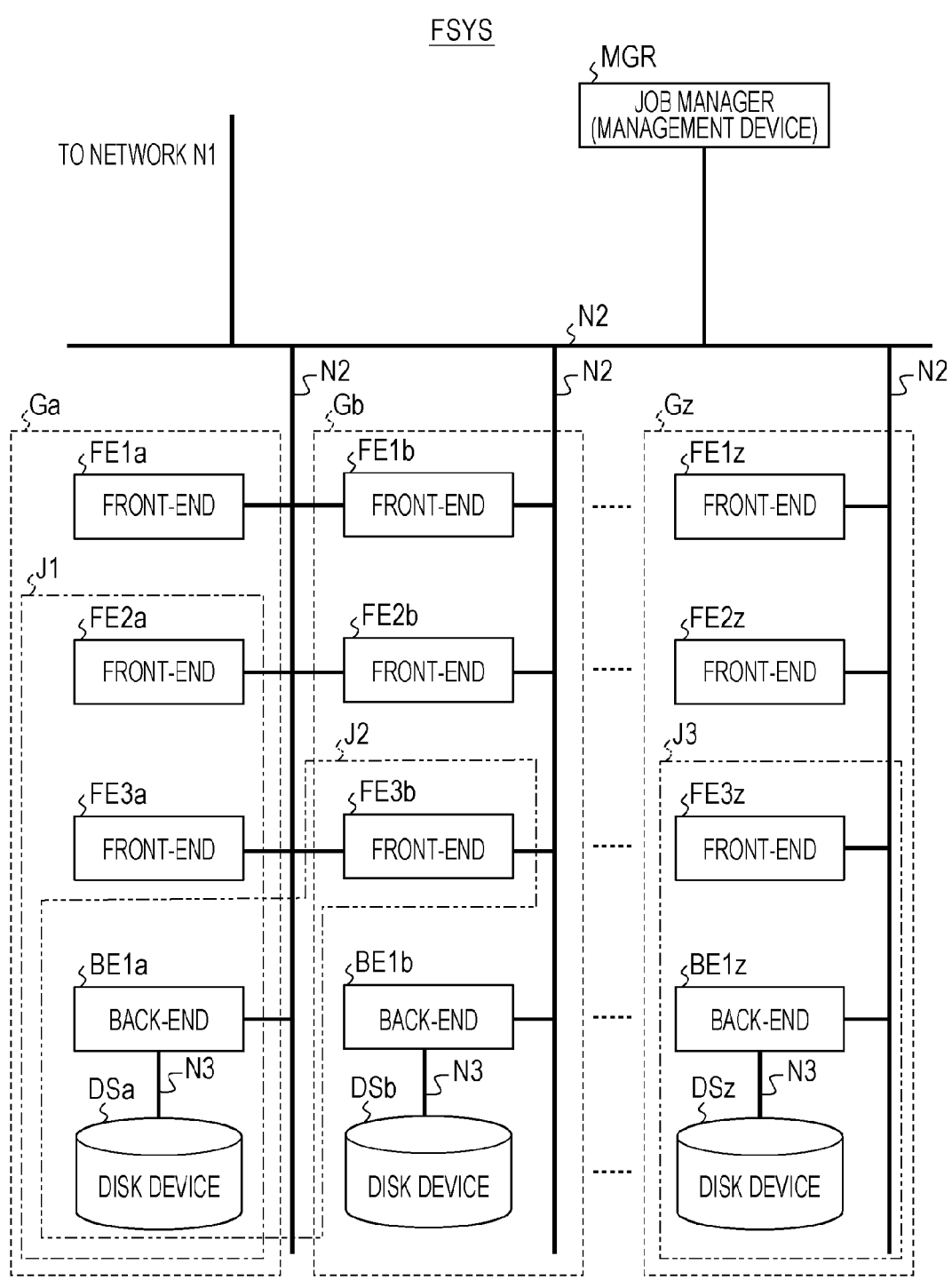
FIG. 2 is a block diagram illustrating a file system FSYS of FIG. 1.

The first job node ND1 executes user log-in processing, program development, and job operation of the file system FSYS to a job manager (see FIG. 2). As the job operation, the first job node ND1, for example, inputs a job into the job manager, and instructs the job manager to execute the job. The job is a management unit of a series of programs executed by the user as a single unit. In other words, the job is a unit of a processing for which a computer is caused to execute.

[File System]

FIG. 2 is a block diagram illustrating the file system FSYS of FIG. 1. The file system FSYS includes multiple information processing devices, multiple storage devices, and a management device, that are connected to a communications network. The communications network is, for example, networks N2, N3 (see heavy lines). Multiple information processing devices are, for example, multiple front-end server devices FE1$a$, FE2$a$, FE3$a$, FE1$b$, FE2$b$, FE3$b$, FE1$z$, FE2$z$, FE3$z$, and multiple back-end server devices BE1$a$, BE1$b$, BE1$z$. Multiple storage devices are disk devices DSa, DSb, DSz. The management device is, for example, a job manager (management device) MGR.

In the description below, the job manager (management device) MGR is referred to as a job manager MGR as appropriate, the front-end server device is referred to as a front-end as appropriate, and the back-end server device is referred to as a back-end as appropriate. In FIG. 2, the numbers of the front-ends, the back-ends, and the disk devices are examples. Dotted lines in FIG. 2 schematically indicate that front-ends, back-ends, and disk devices are omitted.

The job manager MGR, the front-ends FE1$a$, FE2$a$, FE3$a$, FE1$b$, FE2$b$, FE3$b$, FE1$z$, FE2$z$, FE3$z$, and the back-ends BE1$a$, BE1$b$, BE1$z$ are connected to the network N2. The network N2 is, for example, a local area network.

Meanwhile, the job manager MGR, the front-ends FE1$a$, FE2$a$, FE3$a$, FE1$b$, FE2$b$, FE3$b$, FE1$z$, FE2$z$, FE3$z$, and the back-ends BE1$a$, BE1$b$, BE1$z$ are capable of communicating with one another via the network N2. Furthermore, the front-ends are capable of communicating with one another via the network N2.

The back-end BE1$a$ is connected to the disk device DSa via the network N3, the back-end BE1$b$ is connected to the disk device DSb via the network N3, and the back-end BE1$z$ is connected to the disk device DSz via the network N3. The network N3 is, for example, a local area network.

In the description below, the front-ends FE1$a$, FE2$a$, FE3$a$, FE1$b$, FE2$b$, FE3$b$, FE1$z$, FE2$z$, FE3$z$ are referred to merely a front-end as appropriate. Further, the back-ends BE1$a$, BE1$b$, BE1$z$ are referred to merely a back-end as appropriate. Further, the disk devices DSa, DSb, DSz are referred to merely a disk device.

(Job Manager)

The job manager MGR manages job execution, the multiple front-ends, the multiple back-ends, and the multiple disk devices. For example, the job manager MGR receives a job execution instruction inputted from the first job node ND1. Upon receiving the execution instruction, the job manager MGR determines a resource within the information processing system ISYS to which the job inputted from the first job node ND1 is allocated. In the example of FIG. 2, the resources are a front-end (such as, for example, the front-end FE1$a$), a back-end (such as, for example, the back-end BE1$a$), and a disk device (such as, for example, DSa).

(Front-end, Back-end, and Disk Device)

The front-end (such as, for example, the front-end FE1$a$) executes a job allocated by the job manager MGR. Then, the front-end, for example, transfers data created by execution of the job, and a write request of the data to a back-end (for example, the back-end BE1$a$).

Upon receiving the data and the data write request, the back-end (for example, the back-end BE1$a$) responds to the received data write request, and writes the received data into a disk device (for example, the disk device DSa) connected thereto.

The disk devices DSa, DSb, DSz are so-called storage servers, including, for example, a high-capacity hard disk drive and a solid state drive.

A group Ga indicated with a broken line is a unit including the front-ends FE1$a$, FE2$a$, FE3$a$, the back-end BE1$a$, and the disk device DSa. A group Gb indicated with a broken line is a unit including the front-ends FE1$b$, FE2$b$, FE3$b$, the back-end BE1$b$, and the disk device DSb. A group Gz indicated with a broken line is a unit including the front-ends FE1$z$, FE2$z$, FE3$z$, the back-end BE1$z$, and the disk device DSz. The front-ends, the back-end, and the disk device of each of the groups Ga, Gb, . . . , Gz are housed, for example, in the same rack respectively. Reference signs J1 to J3 are described in detail with reference to FIGS. 9 and 16.

(Execution of Job)

The job manager MGR, for example, responds to a job execution instruction from the first job node ND1 by determining a front-end that executes the job out of the multiple front-ends. Further, the job manager MGR determines, out of the multiple disk devices, a disk device that stores data created by execution of the job, and data to be used for execution of the job. Then, the job manager MGR causes the determined front-end to execute the job. The determined front-end stores data created by execution of the job into the determined disk device, or reads data to be used for execution of the job from the determined disk device.

In the file system FSYS of FIG. 2, throughput of the file system FSYS may drop due to communication delay in networks N2, N3. In particular, when multiple jobs are executed concurrently, network communication is prone to delay and thereby throughput of the file system FSYS drops.

Further, according to the job execution state, load of the network communication may fluctuate dynamically. For example, when a job of accessing to a disk device is executed frequently, load of the network communication increases dynamically. This results in delaying the network communication, and thereby throughput of the file system FSYS drops.

In order to suppress the drop of throughput, it is preferable to optimize throughput of the file system FSYS as a whole in real time by considering not only hardware performance but also the network communication load fluctuating every moment. The hardware is, for example, a front-end, a back-end, and a disk device.

When managing a disk device in a large-scale parallel distributed system in the field of the high-performance computing (HPC), it is common to use a distributed file system in which multiple disk devices are entirely handled as one file system. In the distributed file system, it is preferable to optimize throughput of the file system in real time since the network load largely fluctuates when a lot of jobs are executed.

In view of the foregoing, the file system FSYS according to this embodiment optimizes throughput of the file system in real time.

[Job Manager]

Figure 3:
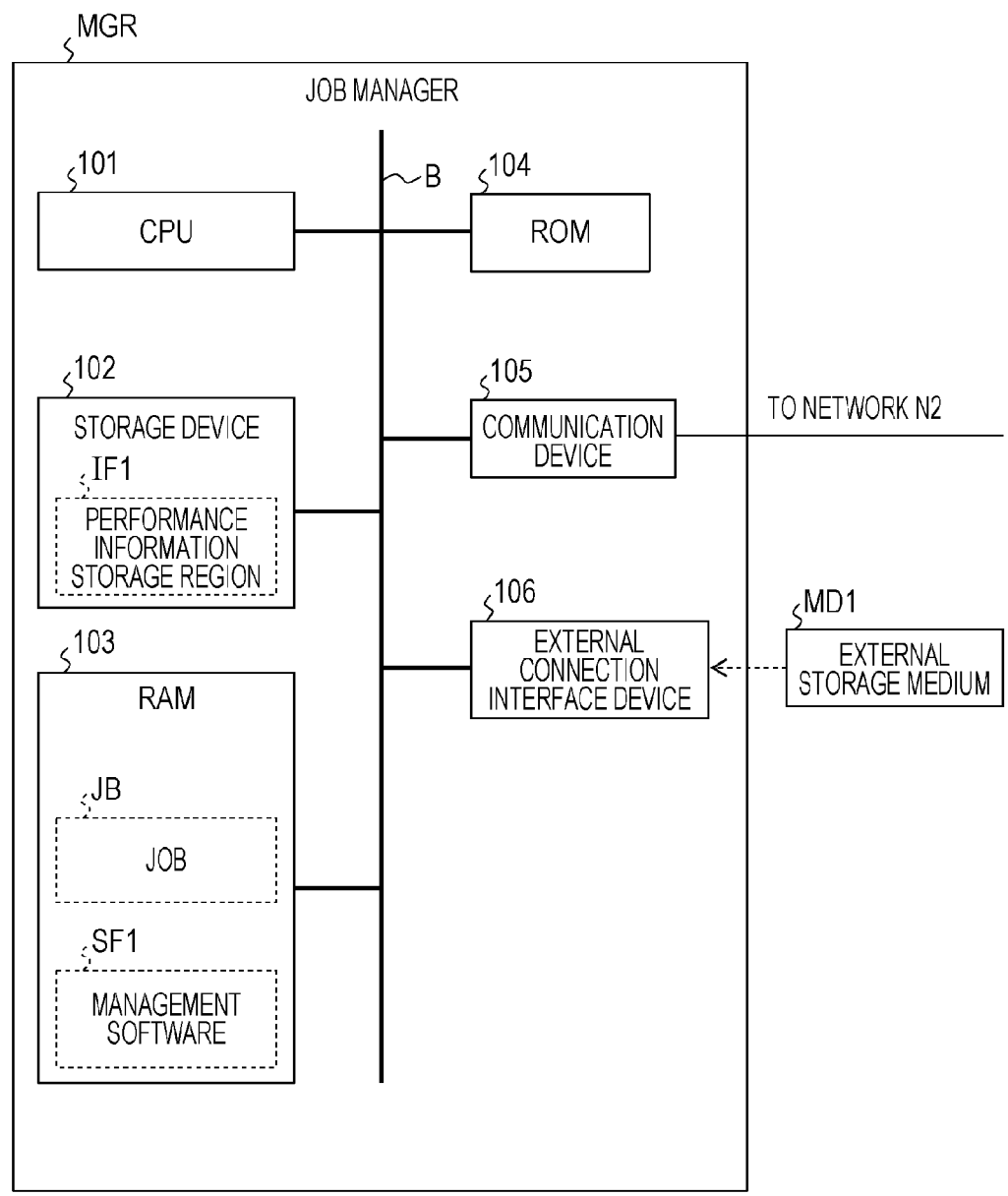
FIG. 3 is a hardware block diagram of a job manager MGR of FIG. 2.

The job manager MGR is described with reference to FIGS. 3 and 4. FIG. 3 is a hardware block diagram of the job manager MGR of FIG. 2. The job manager MGR includes a CPU 101, a storage device 102, a RAM 103, a ROM 104, a communication device 105, and an external connection interface device 106, all of which are connected to a bus B. In the description below, the storage device 102 is referred to as a storage 102 as appropriate.

CPU is an abbreviation for "central processing unit", RAM is an abbreviation for "random access memory", and ROM is an abbreviation for "read only memory".

The CPU 101 is a central processing unit configured to control the job manager MGR as a whole. The storage 102 is a storage device such as, for example, a hard disk drive, a solid state drive, and a nonvolatile semiconductor memory.

The storage 102 includes a performance information storage region IF1. The performance information storage region IF1 is a region for storing performance information of the front-end and performance information of the back-end. Performance information is described with reference to FIGS. 11, 13, and 15. The storage 102 stores an execution file (program) of a management software SF1 that manages job execution.

The RAM 103 temporarily stores a processing executed by the CPU 101, and data created (calculated) in steps executed by the management software SF1. The RAM 103, for example, stores a job inputted from the first job node ND1. In FIG. 3, the RAM 103 stores an inputted job JB. The RAM 103 is a semiconductor memory such as, for example, a dynamic random access memory (DRAM).

When the job manager MGR is activated, the CPU 101 reads an execution file of the management software SF1 from the storage 102 and expands the execution file into the RAM 103. The execution file may be stored in an external storage medium MD1.

The ROM 104 stores various data such as configuration data. The communication device 105 communicates by connecting with the network N2. The communication device 105 is, for example, a network interface card (NIC).

The external connection interface device 106 is a device configured to serve as an interface for connecting the job manager MGR and the external storage medium MD1 with each other. The external connection interface device 106 is, for example, a card slot or USB port.

The external connection interface device 106 may be configured to connect with a storage medium read device (not illustrated) that reads data stored in a storage medium. The storage medium (or recording medium) is, for example, a portable storage device such as, for example, a compact disc read only memory (CD-ROM) and a digital versatile disc (DVD).

Figure 4:
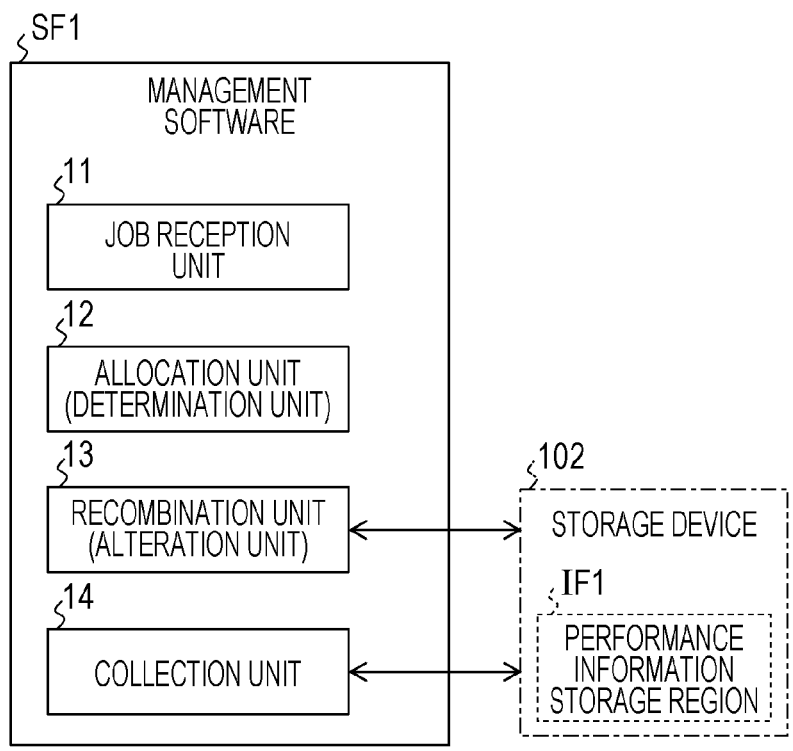
FIG. 4 is a software block diagram of the job manager MGR of FIG. 3.

FIG. 4 is a software block diagram of the job manager MGR of FIG. 3. In FIG. 4, the storage 102, that is a hardware element, is depicted with a single dot chain line.

The management software SF1 manages IP addresses of the front-ends FE1a, FE2a, FE3a, FE1b, FE2b, FE3b, FE1z, FE2z, FE3z, IP addresses of the back-ends BE1a, BE1b, BE1z, and IP addresses of the disk devices DSa, DSb, DSz. The storage 102 stores the above IP addresses. "IP" is an abbreviation for "Internet Protocol".

The management software SF1 manages connection information indicating a connection relationship in the network N2 among the front-ends FE1a, FE2a, FE3a, FE1b, FE2b, FE3b, FE1z, FE2z, FE3z, the back-ends BE1a, BE1b, BE1z, and the disk devices DSa, DSb, DSz. The storage 102 stores the connection information.

The management software SF1 includes a job reception unit 11, an allocation unit (determination unit) 12, a recombination unit (alteration unit) 13, and a collection unit 14. In the description below, the allocation unit (determination unit) 12 is referred to as an allocation unit 12 as appropriate and the recombination unit (alteration unit) 13 is referred as a recombination unit 13 as appropriate.

The job reception unit 11 receives, for example, a job inputted from the first job node ND1, and stores into the RAM 103. The allocation unit 12 determines a resource within the information processing system ISYS to which the job received by the job reception unit 11 is allocated, and allocates the resource to the job. Specifically, the allocation unit 12 determines a front-end that executes the inputted job, and a first disk device that stores data accessed by execution of the job. Further, the allocation unit 12 determines a first path in the network N2 for the determined front-end accessing to the first disk device.

The recombination unit 13 recombines the resource allocated by the allocation unit 12 based on performance information stored in the performance information storage region IF1 of the storage 102. The performance information is an example of state information indicating utilization state of the network by the front-end and the back-end.

When recombining the resource, the recombination unit 13 identifies the following disk device and path based on performance information collected by the collection unit 14. That is, the recombination unit 13 identifies a second disk device enhancing access efficiency by the determined front-end, and a second path in the network N2 enhancing access efficiency by the determined front-end to the second disk device. Further, the recombination unit 13 alters the first disk device and the first path to the second disk device and the second path. This alteration optimizes throughput of the file system. The identification and the alteration are described in detail with reference to FIGS. 16 and 17.

The collection unit 14 collects performance information from the front-ends FE1a, FE2a, FE3a, FE1b, FE2b, FE3b, FE1z, FE2z, FE3z, and the back-ends BE1a, BE1b, BE1z. Then the collection unit 14 stores collected performance information into the performance information storage region IF1 of the storage 102.

[Front-End]

Figure 5:
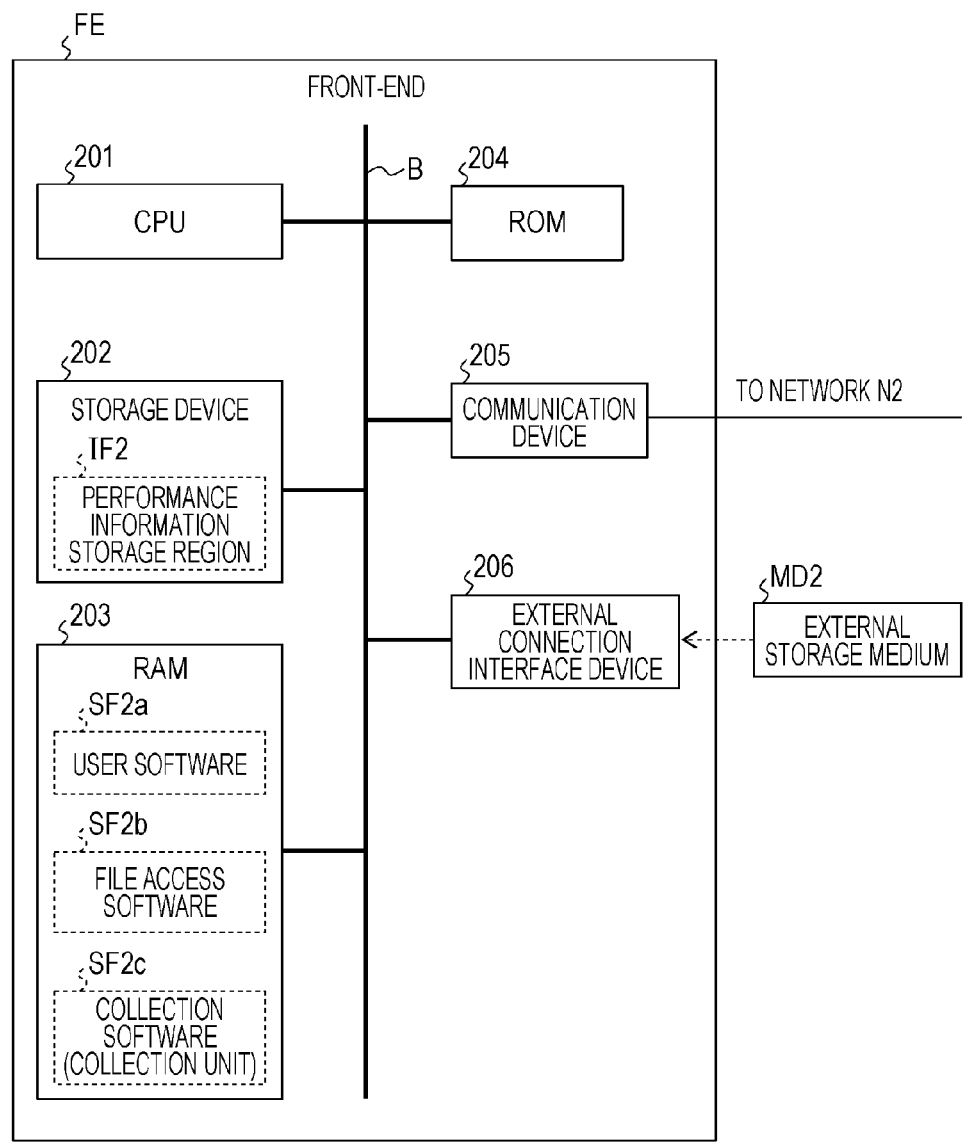
FIG. 5 is a hardware block diagram of a front-end of FIG. 2.

The front-end is described with reference to FIGS. 5 and 6. FIG. 5 is a hardware block diagram of the front-end of FIG. 2. The front-end FE of FIG. 5 represents the front-ends FE1a, FE2a, FE3a, FE1b, FE2b, FE3b, FE1z, FE2z, FE3z of FIG. 2.

The front-end FE includes a CPU 201, a storage device 202, a RAM 203, a ROM 204, a communication device 205, and an external connection interface device 206, all of which are connected to the bus B. In the description below, the storage device 202 is referred to as a storage 202 as appropriate.

The CPU 201 is a central processing unit configured to control the front-end FE as a whole. The storage 202 is a storage device such as, for example, a hard disk drive, a solid state drive, and a nonvolatile semiconductor memory.

The storage 202 includes a performance information storage region IF2. The performance information storage region IF2 is a region for storing performance information of the self device. Performance information is described with reference to FIG. 11. The storage 202 stores an execution file of a user software SF2a, a file access software SF2b, and a collection software (collection unit) SF2c. Hereinafter, the collection software (collection unit) SF2c is referred to as a collection software SF2c as appropriate. The user software SF2a, the file access software SF2b, and the collection software SF2c are described with reference to FIG. 6.

The RAM 203 temporarily stores a processing executed by the CPU 201, and data created (calculated) in steps executed by the user software SF2a, the file access software SF2b, and the collection software SF2c. The RAM 203 is a semiconductor memory such as, for example, a DRAM.

When the front-end FE is activated, the CPU 201 reads an execution file of the file access software SF2b and the collection software SF2c, and expands into the RAM 203. When instructed by the job manager MGR to execute a job, the CPU 201 reads an execution file of the user software SF2a executing the job from the storage 202, and expands into the RAM 203. The execution file may be stored in an external storage medium MD2.

The ROM 204 stores various data such as configuration data. The communication device 205 communicates by connecting with the network N2. The communication device 205 is, for example, a network interface card.

The external connection interface device 206 is a device configured to serve as an interface for connecting the front-end FE and the external storage medium MD2 with each other. The external connection interface device 206 is, for example, a card slot or USB port.

The external connection interface device 206 may be configured to connect with a storage medium read device (not illustrated) that reads data stored in a storage medium. The storage medium is, for example, a portable storage device such as, for example, a CD-ROM and a DVD.

Figure 6:
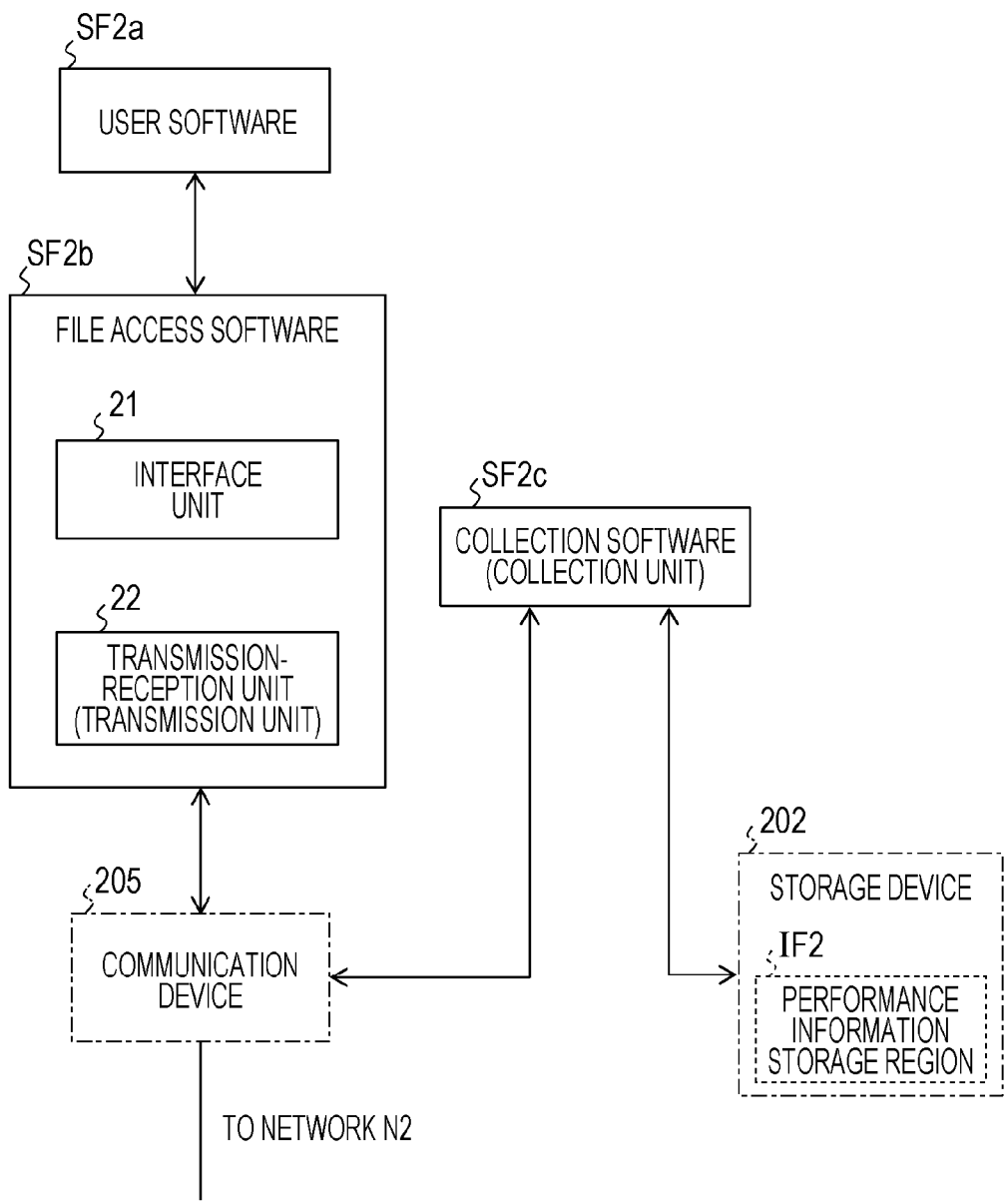
FIG. 6 is a software block diagram of the front-end FE of FIG. 5.

FIG. 6 is a software block diagram of the front-end FE of FIG. 5. In FIG. 6, the storage 202 and the communication device 205, that are hardware elements, are depicted with a single dot chain line. The user software SF2a, that is a user software (user program) executing a job, executes, for example, information processings in parallel. To access to a file for execution of a job, the user software SF2a makes access request to the file access software SF2b. The file access comprises, for example, the following two steps: A first step is to write or store a data file (hereinafter referred to as a file as appropriate) into a disk device. A second step is to read the file stored in the disk device.

In response to the access request of the user software SF2a, the file access software SF2b performs processing corresponding to the request. The file access software SF2b includes an interface unit 21 and a transmission-reception unit (transmission unit) 22. Hereinafter, the transmission-reception unit (transmission unit) 22 is referred to as a transmission-reception unit 22 as appropriate.

The interface unit 21 provides an interface to the user software SF2a. Specifically, the interface unit 21 receives an access request from the user software SF1, and outputs a result to the access request to the user software SF1.

The transmission-reception unit 22 transmits the access request received from the user software SF2a to the back-end and another front-end. The transmission-reception unit 22 receives the access request transmitted from the other first front-end via the communication device 205, and transfers to a second front-end that is different from the back-end and the first front-end. The transmission-reception unit 22 receives the result of the access request transmitted from the back-end and the other front-end via the communication device 205. Then, the transmission-reception unit 22 outputs the result of the received access request to the user software SF2a via the interface unit 21.

The collection software SF2c collects performance information of the self device, and stores into the performance information storage region IF2 of the storage 202. The performance information is an example of state information indicating utilization state of the network N2 by the front-end. The state information is, for example, data transfer efficiency for the front-end to transfer data to the network N2.

Specifically, when the front-end FE is connected to another front-end or a back-end via the network N2, the collection software SF2c of the front-end FE collects data transfer efficiency for transferring data to the other front-end or back-end. The transmission-reception unit 22 transmits performance information collected by the collection software SF2c to the job manager MGR.

[Back-end]

Figure 7:
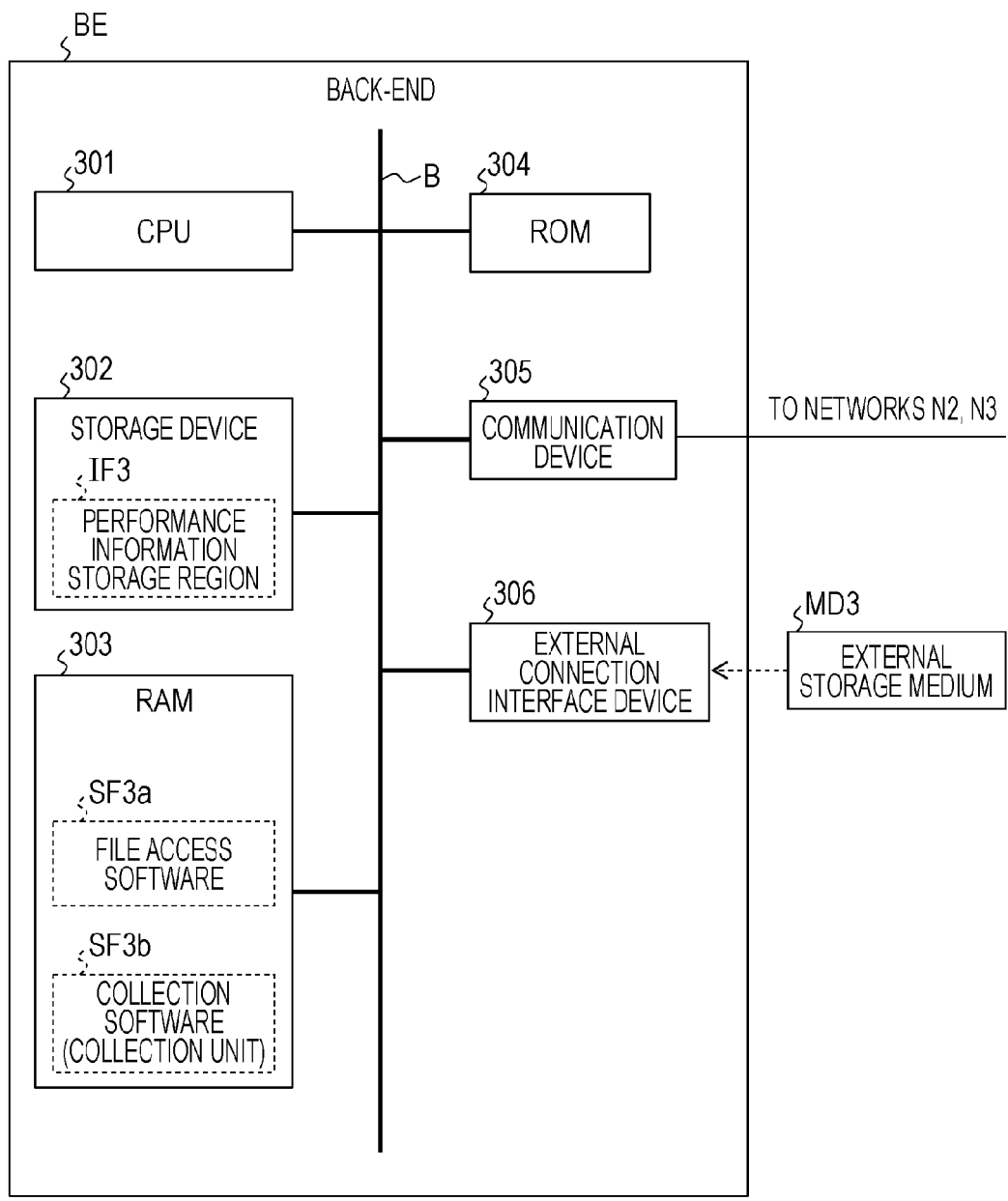
FIG. 7 is a hardware block diagram of a back-end of FIG. 2.

The back-end is described with reference to FIGS. 7 and 8. FIG. 7 is a hardware block diagram of the back-end of FIG. 2. The back-end BE of FIG. 7 represents the back-ends BE1a, BE1b, and BE1z of FIG. 2.

The back-end BE includes a CPU 301, a storage device 302, a RAM 303, a ROM 304, a communication device 305, and an external connection interface device 306, all of which are connected to the bus B. In the description below, the storage device 302 is referred to as a storage 302 as appropriate.

The CPU 301 is a central processing unit configured to control the back-end BE as a whole. The storage 302 is a storage device such as, for example, a hard disk drive, a solid state drive, and a nonvolatile semiconductor memory.

The storage 302 includes a performance information storage region IF3. The performance information storage region IF3 is a region for storing performance information of the self device. Performance information is described with reference to FIG. 13. The storage 302 stores an execution file of the file access software SF3a and the collection software (collection unit) SF3b. Hereinafter, the collection software (collection unit) SF3b is referred to as a collection software SF3b as appropriate. The file access software SF3a and the collection software SF3b are described with reference to FIG. 8.

The RAM 303 temporarily stores a processing executed by the CPU 301, and data created (calculated) in steps executed by the file access software SF3a and the collection software SF3b. The RAM 303 is a semiconductor memory such as, for example, a DRAM.

When the back-end BE is activated, the CPU 301 reads an execution file of the file access software SF3a and the collection software SF3b from the storage 302, and expands into the RAM 303. The execution file may be stored in an external storage medium MD3.

The ROM 304 stores various data such as configuration data. The communication device 305 is connected to the front-end via the network N2 to communicate therewith, and connected to the disk device via the network N3 to communicate therewith. The communication device 305 is, for example, a network interface card.

The external connection interface device 306 is a device configured to serve as an interface for connecting the back-end BE and the external storage medium MD3 with each other. The external connection interface device 306 is, for example, a card slot or USB port.

The external connection interface device 306 may be configured to connect with a storage medium read device (not illustrated) that reads data stored in a storage medium. The storage medium is, for example, a portable storage device such as, for example, a CD-ROM and a DVD.

Figure 8:
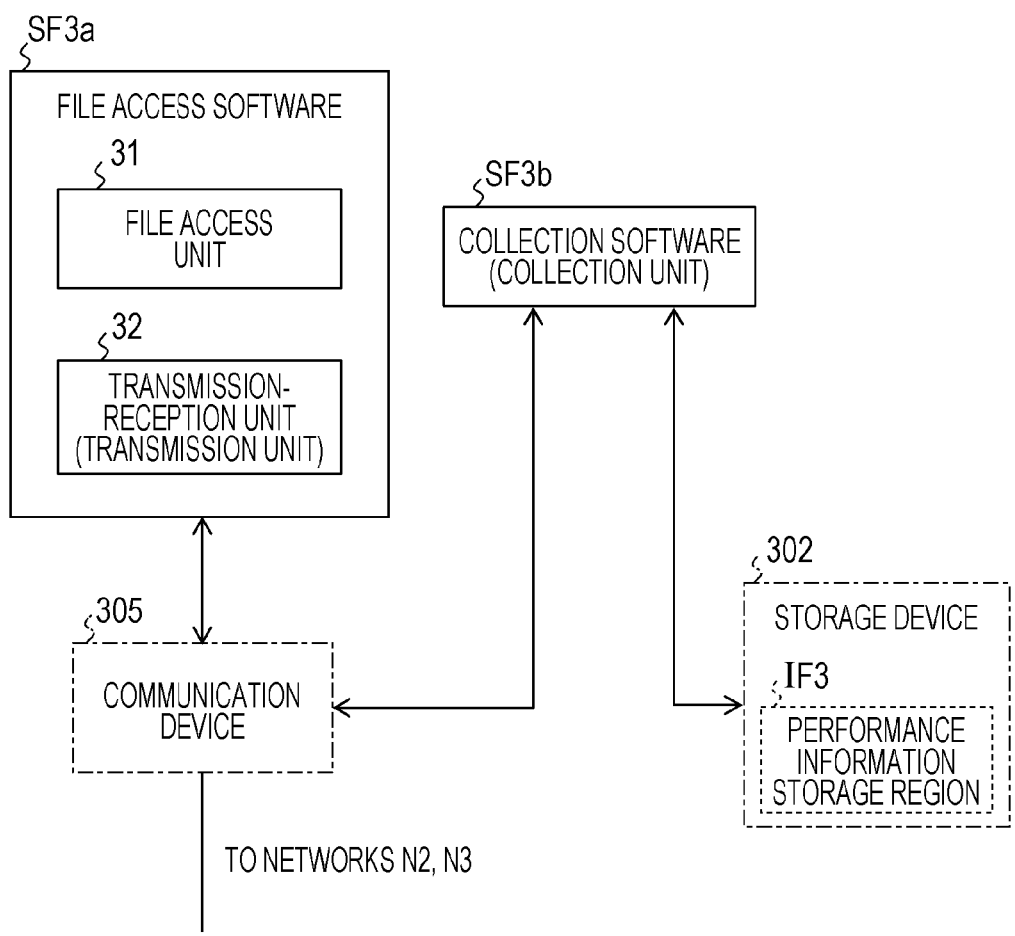
FIG. 8 is a software block diagram of the back-end BE of FIG. 7.

FIG. 8 is a software block diagram of the back-end BE of FIG. 7. In FIG. 8, the storage 302 and the communication device 305, that are hardware elements, are depicted with a single dot chain line. In response to the access request from the front-end FE, the file access software SF3a executes access processing to a file stored by the disk device.

The file access software SF3a includes a file access unit 31 and a transmission-reception unit (transmission unit) 32. Hereinafter, the transmission-reception unit (transmission unit) 32 is referred to as a transmission-reception unit 32 as appropriate.

In response to the access request received by the transmission-reception unit 32, the file access unit 31 accesses to a file stored by the disk device to which the back-end BE is connected. The file access unit 31 outputs the result of file access (for example, successful access or success failure) to the transmission-reception unit 32.

The transmission-reception unit 32 receives the access request from the front-end FE via the communication device 305. The transmission-reception unit 32 transmits the access result inputted from the file access unit 31 to the front-end FE that has made the access request, via the communication device 305.

The collection software SF3b collects performance information of the self device, and stores into the performance information storage region IF3 of the storage 302. The performance information is an example of state information indicating utilization state of the network N2 and the network N3 by the back-end. The state information is a data transfer efficiency, for example, when the back-end transfers data to the network N2 and the network N3.

Specifically, the collection software SF3 of the back-end BE collects data transfer efficiency for transferring data to the front-end connected via the network N2, and the disk device connected via the network N3. The transmission-reception unit 32 transmits performance information collected by the collection software SF3b to the job manager MGR.

(Flow of Processing of Job Manager)

Figure 9:
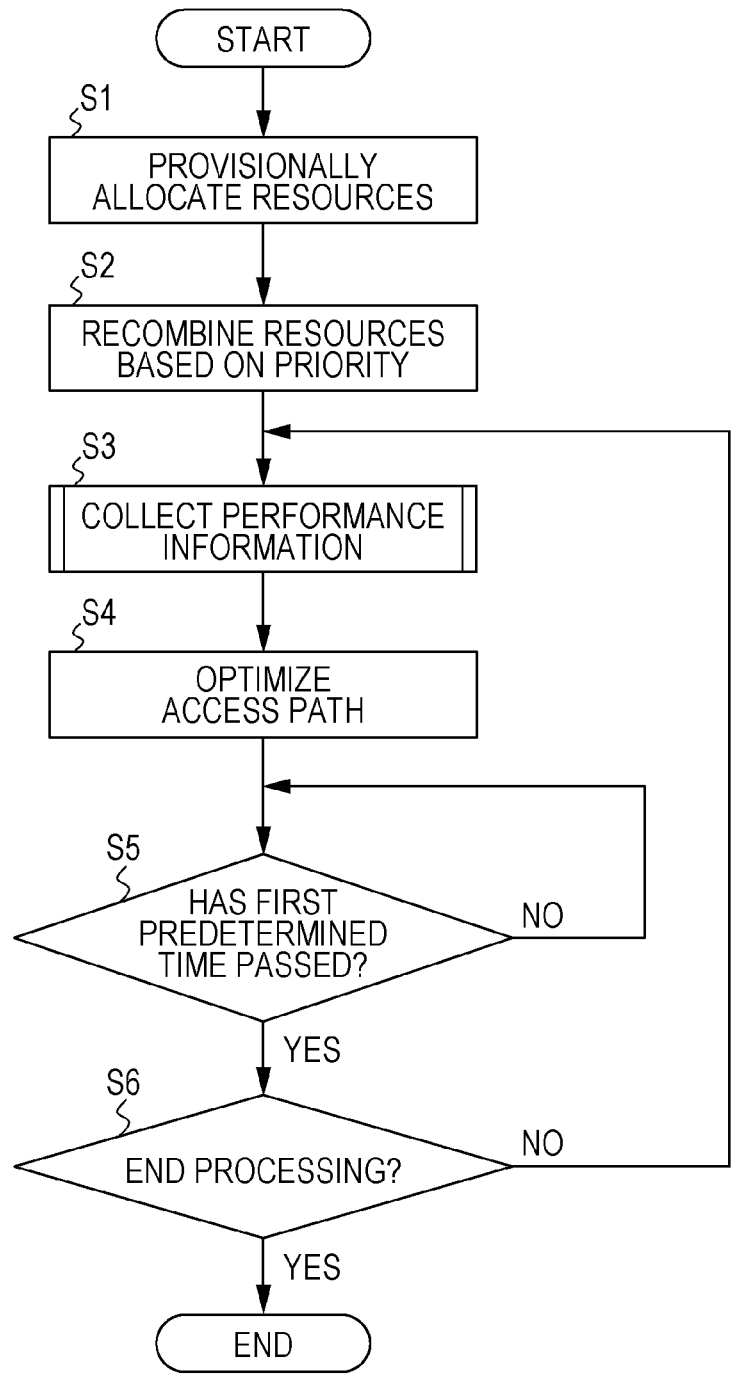
FIG. 9 is a flowchart illustrating a flow of processings of the job manager MGR of FIGS. 3 and 4.

FIG. 9 is a flowchart illustrating a flow of processings of the job manager MGR of FIGS. 3 and 4. In the below description of the flowchart, "Ss" (s of the lower case letter is an integer larger than 1) represents a step Ss.

Step S1: The allocation unit 12 of the job manager MGR determines a resource within the information processing system ISYS to which a job (hereinafter referred to as a job JB as appropriate) received by the job reception unit 11 is allocated. Then, the allocation unit 12 provisionally allocates the resource to the job JB. Hereinafter, provisionally allocating the resource to the job is referred to as provisional allocation as appropriate.

Step S2: Based on the priority configured to the job JB, the recombination unit 13 recombines resources provisionally allocated by the allocation unit 12. Specific processings of S1 and S2 are described later.

Step S3: The collection unit 14 collects performance information from the front-ends FE1a, FE2a, FE3a, FE1b, FE2b, FE3b, FE1z, FE2z, FE3z, and the back-ends BE1a, BE1b, BE1z of FIG. 2. Then, the collection unit 14 stores collected performance information into the performance information storage region IF1 of the storage 102. Specific processing of S3 is described with reference to FIGS. 14 and 15.

Step S4: Based on the performance information collected in S3, the recombination unit 13 executes optimization of the access path. The access path is a path from the front-end FE to the disk device connected to the back-end BE when the front-end FE executes file access. Optimization of the access path is a processing of recombining the access path so as to maximize access efficiency for the front-end FE to execute file access. Processing of S4 is described in detail with reference to FIGS. 16 and 17.

Step S5: The management software SF1 determines whether a first predetermined time (for example, 10 minutes) has passed. If the predetermined time has not yet passed (S5: NO), the determination processing of the step S5 continues. If the predetermined time has passed (S5: YES), the process shifts to S6. The first predetermined time may be set as appropriate.

Step S6: The management software SF1 determines whether to end processing. For example, the user instructs the job manager MGR via the first job node ND1 to end processing. Then, the management software SF1 receives the instruction and determines to end processing. When determined to end processing (S6: YES), the management software SF1 ends execution management of the job. When the management software SF1 has determined not to end processing (S6: NO), or when the management software SF1 does not receive the instruction, the process shifts to S3.

(Provisional Allocation of Resource)

Next, the provisional allocation of FIG. 9 (S1) is described with reference to FIGS. 2 and 4. The allocation unit 12 determines one or more front-ends that execute the job JB received by the job reception unit 11. Further, the allocation unit 12 determines a disk device that stores a file accessed by execution of the job JB, and a back-end to be connected to the disk device. The determination corresponds to the determination of the resource allocation described with reference to FIG. 2.

The allocation unit 12 makes the above determination based on the priority configured to the job JB, and the hardware performance of the front-end, the back-end, and the disk device. That is, the allocation unit 12 determines a resource to which the job is allocated, based on the priority configured to the job JB, and hardware performance of the front-end, the back-end, and the disk device. In this case, hardware performance of the front-end and the back-end includes such as, for example, the number of clocks of CPU, RAM capacity, and bandwidth. Hardware performance of the disk device includes capacity of the storage device, speed of writing into data stored in the storage device, and speed of reading data stored in the storage device.

The priority configured to the job JB is, for example, a job execution preference ranging from "1" to "5". In this case, the priority "5" is a highest priority, and the priority becomes lower as the value becomes smaller.

The allocation unit 12 allocates a high priority job to a front-end, a back-end, and a disk device having high hardware performance. On the other hand, the allocation unit 12 allocates a low priority job to a front-end, a back-end, and a disk device having low hardware performance.

Further, the allocation unit 12 determines front-ends executing the job such that multiple jobs are not executed by one front-end. This determination is made to reduce concentration of the processing load to one front-end. In the example of FIG. 2, hardware performance of the front-ends FE3a, FE2a, FE3b, FE2b, FE3z, and FE2z is higher than hardware performance of the front-ends FE1a, FE1b, and FE1z. Further, hardware performance of the back-ends BE1a, BE1z is higher than hardware performance of the back-end BE1b. Further, hardware performance of the disk devices DSa, DSz is higher than hardware performance of the disk device DSb.

Here, the first job node ND1 inputs first to third jobs into the job manager MGR, and instructs the job manager MGR to execute the first to third jobs. The first job node ND1 has configured a priority to the first to third jobs in advance. The first to third jobs are, for example, data analysis processing.

For the job priority, the first job is given the highest priority (for example, priority 5), the second job is given a next high priority (for example, priority 4), and the third job is given a further next priority (for example, priority 3). The job reception unit 11 of the job manager MGR receives the first to third jobs and stores into the RAM 103. The allocation unit 12 determines a resource to be allocated to the first to third jobs. Hereinafter, a resource allocated to a job is referred to as a resource of a job as appropriate.

Since the first job has a highest priority, the allocation unit 12 determines the high performance front-ends FE2a, FE3a to execute the first job. The first job is a job in which information processing is executable in parallel. Therefore, the allocation unit 12 allocates multiple front-ends to the first job and causes the front-ends to execute information processing in parallel for speeding up information processing. Further, the allocation unit 12 determines the disk device DSa that stores a file accessed by execution of the first job, and the back-end BE1a connected to the disk device DSa. Resources of the first job are the front-ends FE2a, FE3a, the back-end BE1a, and the disk device DSa. Resources of the first job are enclosed with a dashed dotted line of a reference sign 31 of FIG. 2.

Then, the allocation unit 12 transmits first execution information to the determined front-ends FE2a, FE3a and back-end BE1a. The first execution information includes internet protocol (IP) addresses of the determined front-ends FE2a, FE3a and back-end BE1a, and first path information indicating a path from the determined front-ends FE2a, FE3a to back-end BE1a. The path information is described later.

The file access software SF2b of the front-ends FE2a, FE3a receives the first execution information and stores into the RAM 203. The file access software SF3a of the back-end BE1a receives the first execution information and stores into the RAM 303.

Next, the allocation unit 12 determines the high performance front-end FE3b to execute a second job. Further, the allocation unit 12 determines the disk device DSa that stores a file accessed by execution of the second job, and the back-end BE1a connected to the disk device DSa. Resources of the second job are the front-end FE3b, the back-end BE1a, and the disk device DSa. The resources of the second job are enclosed with a dashed double-dotted line of a reference sign 32 of FIG. 2.

Then, the allocation unit 12 transmits second execution information to the determined front-end FE3b and back-end BE1a. The second execution information includes IP addresses of the determined front-end FE3b and back-end BE1a, and second path information indicating a path from the determined front-end FE3b to the back-end BE1a. The path information is described later.

The file access software SF2b of the front-end FE3b receives the second execution information and stores into the RAM 203. The file access software SF3a of the back-end BE1a receives the second execution information and stores into the RAM 303.

Next, the allocation unit 12 determines the low performance front-end FE1z to execute a third job. Further, the allocation unit 12 determines the disk device DSz that stores a file accessed by execution of the third job, and the back-end BE1z connected to the disk device DSz.

Then, the allocation unit 12 transmits third execution information to the determined front-end FE1z and back-end BE1z. The third execution information includes IP addresses of the determined front-end FE1z and back-end BE1z, and third path information indicating a path from the determined front-end FE1z to the back-end BE1z.

The file access software SF2b of the front-end FE1z receives the third execution information and stores into the RAM 203. The file access software SF3a of the back-end BE1z receives the third execution information and stores into the RAM 303.

[Recombination of Resource]

Next, recombination of FIG. 9 (S2) is described with reference to FIGS. 2 and 4. The recombination unit 13 recombines resources allocated to the first to third jobs (S2). In the above example, since the priority of the third job is low, the allocation unit 12 has determined the low performance front-end FE1z as a front-end to execute the third job. At that time, if the high performance front-end FE3z is not executing a job, there is a high possibility of reducing the time from start to end of the job execution by causing the front-end FE3z to execute the third job. This time reduction is made possible by higher hardware performance of the front-end FE3z than the front-end FE1z.

Therefore, if there is a possibility of reducing the time from start to end of a job execution, the recombination unit 13 recombines resources allocated by the allocation unit 12.

In the above example, the recombination unit 13 determines the high performance front-end FE3z executing the third job, and recombines a front-end executing the third job from the low performance front-end FE1z to the high performance front-end FE3z.

Then, the recombination unit 13 transmits the third' execution information to the determined front-end FE3z and back-end BE1z. The third' execution information includes IP addresses of the determined front-end FE3z and back-end BE1z, and third' path information indicating a path from the determined front-end FE3z to the back-end BE1z.

In this case, resources of the third job are the front-end FE3z, the back-end BE1z, and the disk device DSz. The resources of the third job are enclosed with a dashed double-dotted line of a reference sign J3 of FIG. 2.

[Job Execution in Front-end]

Next, job execution in the front-end is described with reference to FIGS. 2, 6, and 8. At a timing such as, for example, when the above recombination processing has ended or when allocation has ended, the allocation unit 12 transmits a job to a front-end executing the job and instructs to execute the job.

In the above example, the allocation unit 12 instructs the front-ends FE2a, FE3a to execute the first job. The user software SF2a of the front-ends FE2a, FE3a executes the first job. Also, the allocation unit 12 instructs the front-end FE3b to execute the second job. The user software SF2a of the front-end FE3b executes the second job. Also, the allocation unit 12 instructs the front-end FE3z to execute the third job. The user software SF2a of the front-end FE3z executes the third job.

To access to a file for execution of a job, the user software SF2a of the front-ends FE2a, FE3a, FE3b, FE3z makes access request to the file access software SF2b. Next, file access processing, that is, writing of a file and reading of a file, is described.

[Access to File]

First, file write request by the user software SF2a of the front-ends FE2a, FE3a, FE3b is described. Description of the file write request by the user software SF2a of the front-end FE1z is omitted as it is not directly involved in the resource recombination by the recombination unit 13 described later.

(Write Request: Front-end FE2a)

The user software SF2a of the front-end FE2a executing the first job requests the file access software SF2b to write data created by execution of the job into a disk device. The interface unit 21 of the file access software SF2b receives this request. The file access software SF2b of the front-end FE2a creates a write packet (hereinafter referred to as a write packet PW2a as appropriate) with reference to the first execution information.

The first execution information includes the first path information. The first path information indicates that the first access path across from the front-end FE2a to the disk device DSa, which are resources of the first job, comprises the front-end FE2a, the front-end FE3a, and the back-end BE1a. That is, the front-end FE2a is capable of accessing to the disk device DSa via (or through) the front-end FE3a and the back-end BE1a. The front-end FE3a is capable of accessing to the disk device DSa via the back-end BE1a.

The file access software SF2b of the front-end FE2a creates the following write packet PW2a. The write packet PW2a includes the IP address of the back-end BE1a as the IP address of the transfer destination, and the IP address of the front-end FE2a as the IP address of the transfer source. The write packet PW2a includes "writing", file path to a written file, data for writing, and file name, as attributes of the access request.

The transmission-reception unit 22 of the front-end FE2a transmits the write packet PW2a to a next front-end or back-end located closer to the disk device DSa in the first access path. In the example of FIG. 2, the transmission-reception unit 22 of the front-end FE2a transmits the write packet PW2a to the next front-end FE3a located closer to the disk device DSa in the first access path.

Upon receiving the write packet PW2a, the transmission-reception unit 22 of the front-end FE3a transmits the write packet PW2a as follows when the transfer destination IP address of the write packet PW2a is the IP address of the back-end BE1a. That is, the transmission-reception unit 22 transmits the write packet PW2a to a next front-end or back-end located closer to the disk device DSa in the first access path. In the example of FIG. 2, the transmission-reception unit 22 of the front-end FE3a transmits the write packet PW2a to the next back-end BE1a located closer to the disk device DSa in the first access path.

Upon receiving the write packet PW2a, the transmission-reception unit 32 of the back-end BE1a outputs the write packet PW2a to the file access unit 31 when the transfer destination IP address of the write packet PW2a is the IP address of the back-end BE1a. When the attribute of the access request of the write packet PW2a is "writing", the file access unit 31 of the back-end BE1a writes data for writing included in the write packet PW2a into the disk device DSa. In the writing, the file access unit 31 writes data for writing into a file designated with a file path and file name included in the write packet PW2a.

The file access unit 31 creates a result packet indicating that writing of the file has succeeded or failed, and outputs to the transmission-reception unit 32. The transmission-reception unit 32 transmits the result packet containing the IP address of the front-end FE2a as the transmission destination IP address to the front-end FE3a. Upon receiving the result packet, the transmission-reception unit 22 of the front-end FE3a transmits the result packet as follows when the transmission destination IP address of the result packet is not the IP address of the self device.

That is, the transmission-reception unit 22 transmits the result packet to the next front-end FE2a located reversely to the disk device DSa in the first access path. Upon receiving the result packet, the transmission-reception unit 22 of the front-end FE2a outputs the result packet to the user software SF2a when the transmission destination IP address of the result packet is the IP address of the self device. When the result packet indicates that writing of the file has succeeded, the user software SF2a of the front-end FE2a executes the next processing after the writing processing. On the other hand, when the result packet indicates that writing of the file has failed, the user software SF2a makes, for example, the write request again.

(Write Request: Front-end FE3a)

The user software SF2a of the front-end FE3a executing the first job requests the file access software SF2b to write data created by execution of the job into a disk device. The interface unit 21 of the file access software SF2b receives this request. The file access software SF2b creates a write packet (hereinafter referred to as a write packet PW3a as appropriate) with reference to the first execution information.

The first execution information includes the first path information. The file access software SF2b of the front-end FE3a creates the following write packet PW3a. The write packet PW3a includes the IP address of the back-end BE1a as the IP address of the transfer destination, and the IP address of the front-end FE3a as the IP address of the transfer source. The write packet PW3a includes "writing", file path to a written file, data for writing, and file name, as attributes of the access request.

The transmission-reception unit 22 of the front-end FE3a transmits the write packet PW3a to a next front-end or back-end located closer to the disk device DSa in the first access path. In the example of FIG. 2, the transmission-reception unit 22 of the front-end FE3a transmits the write packet PW3a to the back-end BE1a located closer to the disk device DSa in the first access path.

Upon receiving the write packet PW3a, the transmission-reception unit 32 of the back-end BE1a outputs the write packet PW3a to the file access unit 31 when the transfer destination IP address of the write packet PW3a is the IP address of the back-end BE1a. When the attribute of the access request of the write packet PW3a is "writing", the file access unit 31 of the back-end BE1a writes data for writing included in the write packet PW3a into the disk device DSa. In the writing, the file access unit 31 writes data for writing into a file designated with a file path and file name included in the write packet PW3a.

The file access unit 31 creates a result packet indicating that writing of the file has succeeded or failed, and outputs to the transmission-reception unit 32. The transmission-reception unit 32 transmits the result packet containing the IP address of the front-end FE3a as the transmission destination IP address to the front-end FE3*a*. Upon receiving the result packet, the transmission-reception unit 22 of the front-end FE3*a* outputs the result packet to the user software SF2*a* when the transmission destination IP address of the result packet is the IP address of the self device. Description of processing of the user software SF2*a* after the result packet has been inputted is omitted as described above.

(Write Request: Front-end FE3*b*)

The user software SF2*a* of the front-end FE3*b* executing the second job requests the file access software SF2*b* to write data created by execution of the job into a disk device. The interface unit 21 of the file access software SF2*b* receives this request. The file access software SF2*b* creates a write packet (hereinafter referred to as a write packet PW3*b* as appropriate) with reference to the second execution information.

The second execution information includes the second path information. The second path information indicates that the second access path across from the front-end FE3*b* to the disk device DSa which are resources of the second job, comprises the front-end FE3*b*, the front-end FE3*a*, and the back-end BE1*a*. That is, the front-end FE3*b* is capable of accessing to the disk device DSa via the front-end FE3*a* and the back-end BE1*a*. In this case, when the front-end communicates with a back-end belonging to a group different from a group to which the front-end belongs, the front-end communicates the back-end via a front-end belonging to the different group. In the above example, the front-end FE3*b* belonging to a group Gb communicates with the back-end BE1*a* belonging to a group Ga via the front-end FE3*a* belonging to the group Ga.

The file access software SF2*b* of the front-end FE3*b* creates the following write packet PW3*b*. The write packet PW3*b* includes the IP address of the back-end BE1*a* as the IP address of the transfer destination, and the IP address of the front-end FE3*b* as the IP address of the transfer source. The write packet PW3*b* includes "writing", file path to a written file, data for writing, and file name, as attributes of the access request.

The transmission-reception unit 22 of the front-end FE3*b* transmits the write packet PW3*b* to a next front-end or back-end located closer to the disk device DSa in the second access path. In the example of FIG. 2, the transmission-reception unit 22 of the front-end FE3*b* transmits the write packet PW3*b* to the next front-end FE3*a* located closer to the disk device DSa in the second access path.

Upon receiving the write packet PW3*b*, the transmission-reception unit 22 of the front-end FE3*a* transmits the write packet PW3*b* as follows when the transfer destination IP address of the write packet PW3*b* is the IP address of the back-end BE1*a*. That is, the transmission-reception unit 22 transmits the write packet PW3*b* to a next front-end or back-end located closer to the disk device DSa in the second access path. In the example of FIG. 2, the transmission-reception unit 22 of the front-end FE3*a* transmits the write packet PW3*b* to the next back-end BE1*a* located closer to the disk device DSa in the second access path.

Upon receiving the write packet PW3*b*, the transmission-reception unit 32 of the back-end BE1*a* outputs the write packet PW3*b* to the file access unit 31 when the transfer destination IP address of the write packet PW3*b* is the IP address of the back-end BE1*a*. When the attribute of the access request of the write packet PW3*b* is "writing", the file access unit 31 writes data for writing included in the write packet PW3*b* into the disk device DSa. In the writing, the file access unit 31 writes data for writing into a file designated with a file path and file name included in the write packet PW3*b*.

The file access unit 31 creates a result packet indicating that writing of the file has succeeded or failed, and outputs to the transmission-reception unit 32. As described above, the result packet is transferred to the front-ends FE3*a*, FE3*b* in a path reverse to the write packet PW3*b*. Description of processing of the user software SF2*a* after the result packet has been inputted in the front-end FE3*b* is omitted as described above.

(Read Request: Front-end FE2*a*)

Next, file read request by the user software SF2*a* of the front-ends FE2*a*, FE3*a*, FE3*b* is described. Description of file read request by the user software SF2*a* of the front-end FE1*z* is omitted as it is not directly involved in the resource recombination by the recombination unit 13 described later.

The user software SF2*a* of the front-end FE2*a* executing the first job requests the file access software SF2*b* to read data from a disk device. The interface unit 21 of the file access software SF2*b* receives this request. The file access software SF2*b* creates a read packet (hereinafter referred to as a read packet PR2*a* as appropriate) with reference to the first execution information. The first execution information includes the first path information.

The file access software SF2*b* of the front-end FE2*a* creates the following read packet PR2*a*. The read packet PR2*a* includes the IP address of the back-end BE1*a* as the IP address of the transfer destination, and the IP address of the front-end FE2*a* as the IP address of the transfer source. The read packet PR2*a* includes "reading", file path to a read file, and name of a file to be read, as attributes of the access request.

The transmission-reception unit 22 of the front-end FE2*a* transmits the read packet PR2*a* to a next front-end or back-end located closer to the disk device DSa in the first access path. In the example of FIG. 2, the transmission-reception unit 22 of the front-end FE2*a* transmits the read packet PR2*a* to the next front-end FE3*a* located closer to the disk device DSa in the first access path.

Upon receiving the read packet PR2*a*, the transmission-reception unit 22 of the front-end FE3*a* transmits the read packet PR2*a* as follows when the transfer destination IP address of the read packet PR2*a* is the IP address of the back-end BE1*a*. That is, the transmission-reception unit 22 transmits the read packet PR2*a* to a next front-end or back-end located closer to the disk device DSa in the first access path. In the example of FIG. 2, the transmission-reception unit 22 of the front-end FE3*a* transmits the read packet PR2*a* to the next back-end BE1*a* located closer to the disk device DSa in the first access path.

Upon receiving the read packet PR2*a*, the transmission-reception unit 32 of the back-end BE1*a* outputs the read packet PR2*a* to the file access unit 31 when the transfer destination IP address of the read packet PR2*a* is the IP address of the back-end BE1*a*. When the attribute of the access request of the read packet PR2*a* is "reading", the file access unit 31 reads a file designated with a file path and file name contained in the read packet PR2*a* from the disk device DSa.

The file access unit 31 creates a result packet including data of the read file, and result information indicating that reading of the file has succeeded or failed, and outputs to the transmission-reception unit 32. The transmission-reception unit 32 transmits the result packet containing the IP address of the front-end FE2*a* as the transmission destination IP address to the front-end FE3*a*. Upon receiving the result packet, the transmission-reception unit 22 of the front-end FE3a transmits the result packet as follows when the transmission destination IP address of the result packet is not the IP address of the self device. That is, the transmission-reception unit 22 transmits the result packet to the next front-end FE2a located reversely to the disk device DSa in the first access path. Upon receiving the result packet, the transmission-reception unit 22 of the next front-end FE2a outputs the result packet to the user software SF2a when the transmission destination IP address of the result packet is the IP address of the self device. When the result packet indicates that reading of the file has succeeded, the user software SF2a executes processing based on data of the read file contained in the result packet. On the other hand, when the result packet indicates that reading of the file has failed, the user software SF2a makes, for example, the read request again.

(Read Request: Front-end FE3a)

The user software SF2a of the front-end FE3a executing the first job requests the file access software SF2b to read data from a disk device. The interface unit 21 of the file access software SF2b receives this request. The file access software SF2b creates a read packet (hereinafter referred to as a read packet PR3a as appropriate) with reference to the first execution information.

The first execution information includes the first path information. The file access software SF2b of the front-end FE3a creates the following read packet PR3a. The read packet PR3a includes the IP address of the back-end BE1a as the IP address of the transfer destination, and the IP address of the front-end FE3a as the IP address of the transfer source. The read packet PR3a includes "reading", file path to a read file, and name of a file to be read, as attributes of the access request.

The transmission-reception unit 22 of the front-end FE3a transmits the read packet PR3a to a next front-end or back-end located closer to the disk device DSa in the first access path. In the example of FIG. 2, the transmission-reception unit 22 of the front-end FE3a transmits the read packet PR3a to the back-end BE1a located closer to the disk device DSa in the first access path.

Upon receiving the read packet PR3a, the transmission-reception unit 32 of the back-end BE1a outputs the read packet PR3a to the file access unit 31 when the transfer destination IP address of the read packet PR3a is the IP address of the back-end BE1a. When the attribute of the access request of the read packet PR3a is "reading", the file access unit 31 reads a file designated with a file path and file name contained in the read packet PR3a from the disk device DSa.

The file access unit 31 creates a result packet including data of the read file, and result information indicating that reading of the file has succeeded or failed, and outputs to the transmission-reception unit 32. The transmission-reception unit 32 transmits the result packet containing the IP address of the front-end FE3a as the transmission destination IP address to the front-end FE3a. Upon receiving the result packet, the transmission-reception unit 22 of the front-end FE3a outputs the result packet to the user software SF2a when the transmission destination IP address of the result packet is the IP address of the self device. Description of processing of the user software SF2a after the result packet has been inputted is omitted as described above.

(Read Request: Front-end FE3b)

The user software SF2a of the front-end FE3b executing the second job requests the file access software SF2b to read data from a disk device. The interface unit 21 of the file access software SF2b receives this request. The file access software SF2b creates a read packet (hereinafter referred to as a read packet PR3b as appropriate) with reference to the second execution information.

The second execution information includes the second path information. The file access software SF2b of the front-end FE3b creates the following read packet PR3b. The read packet PR3b includes the IP address of the back-end BE1a as the IP address of the transfer destination, and the IP address of the front-end FE3b as the IP address of the transfer source. The read packet PR3b includes "reading", file path to a read file, and name of a file to be read, as attributes of the access request.

The transmission-reception unit 22 of the front-end FE3b transmits the read packet PR3b to a next front-end or back-end located closer to the disk device DSa in the second access path. In the example of FIG. 2, the transmission-reception unit 22 of the front-end FE3b transmits the read packet PR3b to the next front-end FE3a located closer to the disk device DSa in the second access path.

Upon receiving the read packet PR3b, the transmission-reception unit 22 of the front-end FE3a transmits the read packet PR3b as follows when the transfer destination IP address of the read packet PR3b is the IP address of the back-end BE1a. That is, the transmission-reception unit 22 transmits the read packet PR3b to a next front-end or back-end located closer to the disk device DSa in the second access path. In the example of FIG. 2, the transmission-reception unit 22 of the front-end FE3a transmits the read packet PR3b to the next back-end BE1a located closer to the disk device DSa in the second access path.

Upon receiving the read packet PR3b, the transmission-reception unit 32 of the back-end BE1a outputs the read packet PR3b to the file access unit 31 when the transfer destination IP address of the read packet PR3b is the IP address of the back-end BE1a. When the attribute of the access request of the read packet PR3b is "reading", the file access unit 31 reads a file designated with a file path and file name contained in the read packet PR3b from the disk device DSa.

The file access unit 31 creates a result packet including data of the read file, and result information indicating that reading of the file has succeeded or failed, and outputs to the transmission-reception unit 32. As described above, the result packet is transferred to the front-ends FE3a, FE3b in a path reverse to the read packet PR3b. Description of processing of the user software SF2a after the result packet has been inputted in the front-end FE3b is omitted as described above.

[Collection of Performance Information]

When a file is accessed by a job execution, processing load of the disk device and the back-end increase. Further, processing load for transmitting and receiving a write packet and a read packet in each front-end increases, and communication traffic in the network increases. This leads to reduction of the communication speed and drop of the access efficiency. As a result, job execution speed goes down. That is, throughput of the file system FSYS drops. For solving this problem, the job manager MGR collects performance information of the front-end FE and the back-end BE, and executes optimization of the access path based on the performance information.

After recombination processing (S2 of FIG. 9) has ended, the job manager MGR executes collection of performance information (S3) while a job is being executed. Before describing collection of performance information by the job manager MGR (S3), collection of performance information of the front-end FE and the back-end BE is described.

(Collection of Performance Information of Front-end FE)

First, collection of performance information of the front-end FE is described with reference to FIGS. 10 and 11.

FIG. 10 is a flowchart illustrating collection of performance information executed by the front-end FE. Once activated, the front-end FE collects performance information of the self device every first predetermined time (for example, every 10 minutes) at regular intervals. The front-end FE may collect performance information of the self device at regular intervals after execution of a job.

Step S101: The collection software SF2c (see FIG. 6) of the front-end FE determines whether the self device is executing the stop processing. The stop processing in S101 is a processing of shutting down the front-end FE.

When the self device is executing the stop processing (S101: YES), the front-end ends performance information collection processing. When the self device is not executing the stop processing (S101: NO), the process shifts to S102.

Step S102: The collection software SF2c of the front-end FE collects performance information of the self device. Hereinafter, collection of performance information of the front-end FE is described specifically.

The transmission-reception unit 22 of FIG. 6 measures total data amount of a second predetermined time transmitted or received via the communication device 205, and stores into the RAM 203. The second predetermined time is, for example, 10 minutes. Then, the collection software SF2c calculates data transmission and reception amount (hereinafter referred to as a transfer efficiency as appropriate) per a third predetermined time, and stores into the RAM 203. The third predetermined time is, for example, 1 second.

The transmission-reception unit 22 of FIG. 6 may measure total data amount of a second predetermined time transmitted via the communication device 205, and store into the RAM 203. Then, the collection software SF2c may calculate data transmission amount per the third predetermined time, and store into the RAM 203.

The collection software SF2c stores the measured data amount and the calculated transfer efficiency into the performance information storage region IF2 of the storage 202 as performance information of the front-end FE. Hereinafter, the data amount is indicated in mebibyte (MiB). The second and third predetermined times may be set as appropriate.

Here, when the front-end FE is not executing a job, the transmission-reception unit 22 transmits test data, for example, to the job manager MGR experimentally, and calculates the transfer efficiency. At that time, if the transfer efficiency cannot be calculated, due to an error or any other reasons, the transmission-reception unit 22 may stores the measured data amount into the RAM 203 as "0", and the transfer efficiency may be deemed maximum (for example, 200 (MiB/S)).

Step S103: The collection software SF2c of the front-end FE determines whether the first predetermined time (for example, 10 minutes) has passed. If the predetermined time has not yet passed (S103: NO), the determination processing of the step S103 continues. If the predetermined time has passed (S103: YES), the process shifts to S102.

FIG. 11 is a table for storing performance information of the front-end FE. A performance information table T1 of the front-end FE is stored into the performance information storage region IF2 of the storage 202.

The performance information table T1 of the front-end FE includes a front-end identifier field, a type identifier field, and a performance information field. The front-end identifier field stores the identifier of the front-end FE. The identifier of the front-end FE is stored in the storage 202. The identifier of the front-end FE is, for example, an IP address assigned to the front-end FE, a production number of the front-end FE, or a MAC address assigned to the communication device 205 of the front-end FE. "MAC" of the MAC address is an abbreviation for "media access control address". In the description below, the identifier of the front-end FE is referred to as "FE", the reference sign of the front-end FE.

The type identifier field stores a type identifier for identifying the type of the device that has transmitted performance information, that is, a front-end or a back-end. If the device that has transmitted performance information is a front-end, "NET" is stored. "NET" is an abbreviation for "network".

The performance information field is a field for storing the transfer efficiency calculated by the collection software SF2c of the front-end FE. The performance information field may store total data amount of the second predetermined time measured by the transmission-reception unit 22.

For example, the collection software SF2c of the front-end FE2a of FIG. 2 reads the identifier "FE2a" of the front-end FE2a from the storage 202, and stores into the front-end identifier field of the performance information table T1. The collection software SF2c stores the type identifier "NET" into the type identifier field of the performance information table T1. The collection software SF2c of the front-end FE2a stores the calculated transfer efficiency (for example, 100 (MiB/S)) into the performance information field of the performance information table T1.

Upon receiving a timing when collection of performance information has ended, or a transmission request from the collection unit 14 (see FIG. 4) of the job manager MGR, the collection software SF2c creates a performance information packet. The performance information packet includes data stored in the respective fields of the performance information table T1. In the example of FIG. 11, the performance information packet includes the front-end identifier "FE2a", the type identifier "NET", and the performance information "100 (MiB/S)". The transmission-reception unit 22 transmits the created performance information packet to the job manager MGR.

(Collection of Performance Information of Back-end BE)

Next, collection of performance information of the back-end BE is described with reference to FIGS. 12 and 13.

FIG. 12 is a flowchart illustrating collection of performance information executed by the back-end BE. Once activated, the back-end BE collects performance information of the self device at regular intervals. The back-end BE may collect performance information of the self device at regular intervals after execution of the job.

Step S111: The collection software SF3b (see FIG. 8) of the back-end BE determines whether the self device is executing the stop processing. The stop processing in S111 is a processing of shutting down the back-end BE.

When the self device is executing the stop processing (S111: YES), the back-end BE ends performance information collection processing. When the self device is not executing the stop processing (S111: NO), the process shifts to S112.

Step S112: The collection software SF3b of the back-end BE collects performance information of the self device. Hereinafter, collection of performance information of the back-end BE is described specifically.

The transmission-reception unit 32 of FIG. 8 measures total data amount of the second predetermined time transmitted or received via the communication device 305, and stores into the RAM 303. Then, the collection software SF3b calculates data transmission and reception amount (transfer efficiency) per the third predetermined time, and stores into the RAM 303. The third predetermined time is, for example, 1 second.

The transmission-reception unit 32 of FIG. 8 may measure total data amount of the second predetermined time transmitted via the communication device 305, and store into the RAM 303. Then, the collection software SF3b may calculate data transmission amount per the third predetermined time, and store into the RAM 303.

The collection software SF3b stores the measured data amount and the calculated transfer efficiency into the performance information storage region IF3 of the storage 302 as performance information of the back-end BE. Hereinafter, the data amount is indicated in mebibyte (MiB).

Here, when the back-end BE is not executing a job, the transmission-reception unit 32 transmits test data, for example, to a connected disk device experimentally, and calculates the transfer efficiency. At that time, the transmission-reception unit 32 stores the measured data amount into the RAM 303 as "0". Here, when the measured data amount is stored as "0" in the RAM 303, the transfer efficiency is deemed maximum (for example, 200 (MiB/S)).

Step S113: The collection software SF3b of the back-end BE determines whether the first predetermined time (for example, 10 minutes) has passed. If the predetermined time has not yet passed (S113: NO), the determination processing of the step S113 continues. If the predetermined time has passed (S113: YES), the process shifts to S112.

FIG. 13 is a table for storing performance information of the back-end BE. A performance information table T2 of the back-end BE is stored in the performance information storage region IF3 of the storage 302.

The performance information table T2 of the back-end BE includes a back-end identifier field, a type identifier field, and a performance information field. The back-end identifier field stores the identifier of the back-end BE. The identifier of the back-end FE is stored in the storage 302. The identifier of the back-end BE is, for example, an IP address assigned to the back-end BE, a production number of the back-end BE, or a MAC address assigned to the communication device 305 of the back-end BE. In the description below, the identifier of the back-end BE is referred to as "BE", the reference sign of the back-end BE.

The type identifier field stores a type identifier for identifying the type of the device that has transmitted performance information, that is, a front-end or a back-end. If the device that has transmitted performance information is a back-end, "FS" is stored. "FS" is an abbreviation for file system.

The performance information field is a field for storing the transfer efficiency calculated by the collection software SF3b of the back-end BE. The performance information field may store total data amount of the second predetermined time measured by the transmission-reception unit 32.

For example, the collection software SF3b of the back-end BE1a of FIG. 2 reads the identifier "BE1a" of the back-end BE1a from the storage 302, and stores into the back-end identifier field of the performance information table T2. The collection software SF3b of the back-end BE1a stores the type identifier "FS" into the type identifier field of the performance information table T2. The collection software SF3b of the back-end BE1a stores the calculated transfer efficiency (for example, 20 (MiB/S)) into the performance information field of the performance information table T2.

Upon receiving a timing when collection of performance information has ended, or a transmission request from the collection unit 14 (see FIG. 4) of the job manager MGR, the collection software SF3b creates a performance information packet. The performance information packet includes data stored in the respective fields of the performance information table T2. In the example of FIG. 13, the performance information packet includes the back-end identifier "BE1a", the type identifier "FS", and the performance information "20 (MiB/S)". The transmission-reception unit 32 transmits the created performance information packet to the job manager MGR.

(Collection of Performance Information of Job Manager MGR)

The collection unit 14 of the job manager MGR collects performance information of the front-ends FE1a, FE2a, FE3a, FE1b, FE2b, FE3b, FE1z, FE2z, FE3z, and the back-ends BE1a, BE1b, BE1z of FIG. 2 every the first predetermined time (for example, 10 minutes) (S3 of FIG. 9). Collection of performance information of the job manager MGR is described with reference to FIGS. 14 and 15.

Figure 14:
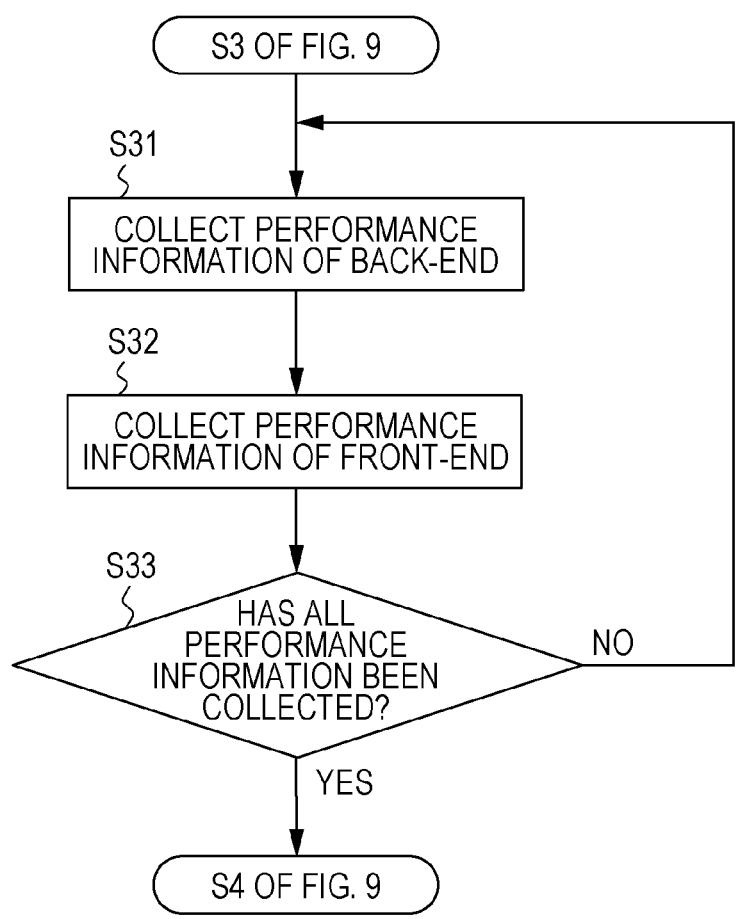
FIG. 14 is a flowchart illustrating collection of performance information executed by the job manager MGR.

FIG. 14 is a flowchart illustrating collection of performance information executed by the job manager MGR.

Step S31: The collection unit 14 of the job manager MGR collects performance information of the back-end BE. For example, the collection unit 14 requests the back-ends BE1a, BE1b, BE1z of FIG. 2 to transmit performance information. Upon receiving the transmission request, the transmission-reception unit 32 of the back-ends BE1a, BE1b, BE1z of FIG. 2 transmits the created performance information packet to the job manager MGR, as described with reference to FIGS. 12 and 13. Upon receiving the performance information packet, the collection unit 14 of the job manager MGR stores the performance information packet into the performance information storage region IF1 of the storage 102.

Step S32: The collection unit 14 of the job manager MGR collects performance information of the front-end FE. For example, the collection unit 14 requests the front-ends FE1a, FE2a, FE3a, FE1b, FE2b, FE3b, FE1z, FE2z, FE3z of FIG. 2 to transmit performance information. Upon receiving the transmission request, the transmission-reception unit 22 of the front-ends FE1a, FE2a, FE3a, FE1b, FE2b, FE3b, FE1z, FE2z, FE3z of FIG. 2 transmits the created performance information packet to the job manager MGR, as described with reference to FIGS. 10 and 11. Upon receiving the performance information packet, the collection unit 14 of the job manager MGR stores the performance information packet into the performance information storage region IF1 of the storage 102.

Step S33: The collection unit 14 of the job manager MGR determines whether performance information has been collected from all the front-ends and back-ends. In the above example, the collection unit 14 determines whether performance information of the front-ends FE1a, FE2a, FE3a, FE1b, FE2b, FE3b, FE1z, FE2z, FE3z and performance information of the back-ends BE1a, BE1b, BE1z of FIG. 2 have been collected. If performance information has been collected from all the front-ends and back-ends (S33: YES), the process proceeds to S4 of FIG. 9. If performance information has not been collected from all the front-ends and back-ends (S33: NO), the process returns to S31 to collect performance information not yet collected.

FIG. 15 is a table for storing performance information collected by the job manager MGR. A performance information table T3 of the job manager MGR illustrated in FIG. 15 is stored into the performance information storage region IF1 of the storage 102.

The performance information table T3 of the job manager MGR includes a group identifier field, a front-end/back-end identifier field, a type identifier field, and a performance information field.

The front-end/back-end identifier field stores a front-end identifier or a back-end identifier contained in one performance information packet received by the collection unit 14. Hereinafter, the one performance information packet is referred to as a performance information packet Pp as appropriate.

The type identifier field stores a type identifier contained in the performance information packet Pp. The performance information field stores performance information contained in the performance information packet Pp. The group identifier field stores a group identifier. The group identifier is an identifier of a group to which a front-end or a back-end belongs. The front-end is a front-end identified by a front-end identifier contained in the performance information packet Pp. The back-end is a back-end identified by a back-end identifier contained in the performance information packet Pp belongs.

The collection unit 14 of the job manager MGR, for example, receives a performance information packet (hereinafter referred to as performance information packet Pp1 as appropriate) that contains the front-end identifier "FE2$a$", the type identifier "NET", and the performance information "100 (MiB/S)", which are described with reference to FIG. 11.

The collection unit 14 stores the front-end identifier "FE2$a$" of the performance information packet Pp1 into a cell where a line LN1 and the front-end/back-end identifier field cross each other. The collection unit 14 stores the type identifier "NET" of the performance information packet Pp1 into a cell where the line LN1 and the type identifier field cross each other. The collection unit 14 stores the performance information "100 (MiB/S)" of the performance information packet Pp1 into a cell where the line LN1 and the performance information field cross each other. Then, the collection unit 14 stores an identifier "Ga" of a group to which the front-end FE2$a$ identified with the front-end identifier "FE2$a$" belongs into a cell where the line LN1 and the group identifier field cross each other. In the example of FIG. 2, a group to which the front-end FE2$a$ belongs is the group Ga. A reference sign "Ga" of the group Ga is the group identifier.

The collection unit 14 of the job manager MGR, for example, receives a performance information packet (hereinafter referred to as performance information packet Pp2 as appropriate) that contains the back-end identifier "BE1$a$", the type identifier "FS", and the performance information "20 (MiB/S)", which are described with reference to FIG. 13.

The collection unit 14 stores the back-end identifier "BE1$a$" of the performance information packet Pp2 into a cell where a line LN2 and the front-end/back-end identifier field cross each other. The collection unit 14 stores the type identifier "FS" of the performance information packet Pp2 into a cell where the line LN2 and the type identifier field cross each other. The collection unit 14 stores the performance information "20 (MiB/S)" of the performance information packet Pp2 into a cell where the line LN2 and the performance information field cross each other. In the example of FIG. 2, a group to which the back-end BE1$a$ belongs is the group Ga. A reference sign "Ga" of the group Ga is the group identifier.

As described with reference to FIGS. 14 and 15, the collection unit 14 collects performance information of the front-ends FE1$a$, FE2$a$, FE3$a$, FE1$b$, FE2$b$, FE3$b$, FE1$z$, FE2$z$, FE3$z$, and performance information of the back-ends BE1$a$, BE1$b$, BE1$z$ of FIG. 2 (S3 of FIG. 9). Then the collection unit 14 stores collected performance information into the performance information table T3 of the job manager MGR (S3).

[Optimization of Access Path]

Figure 16:
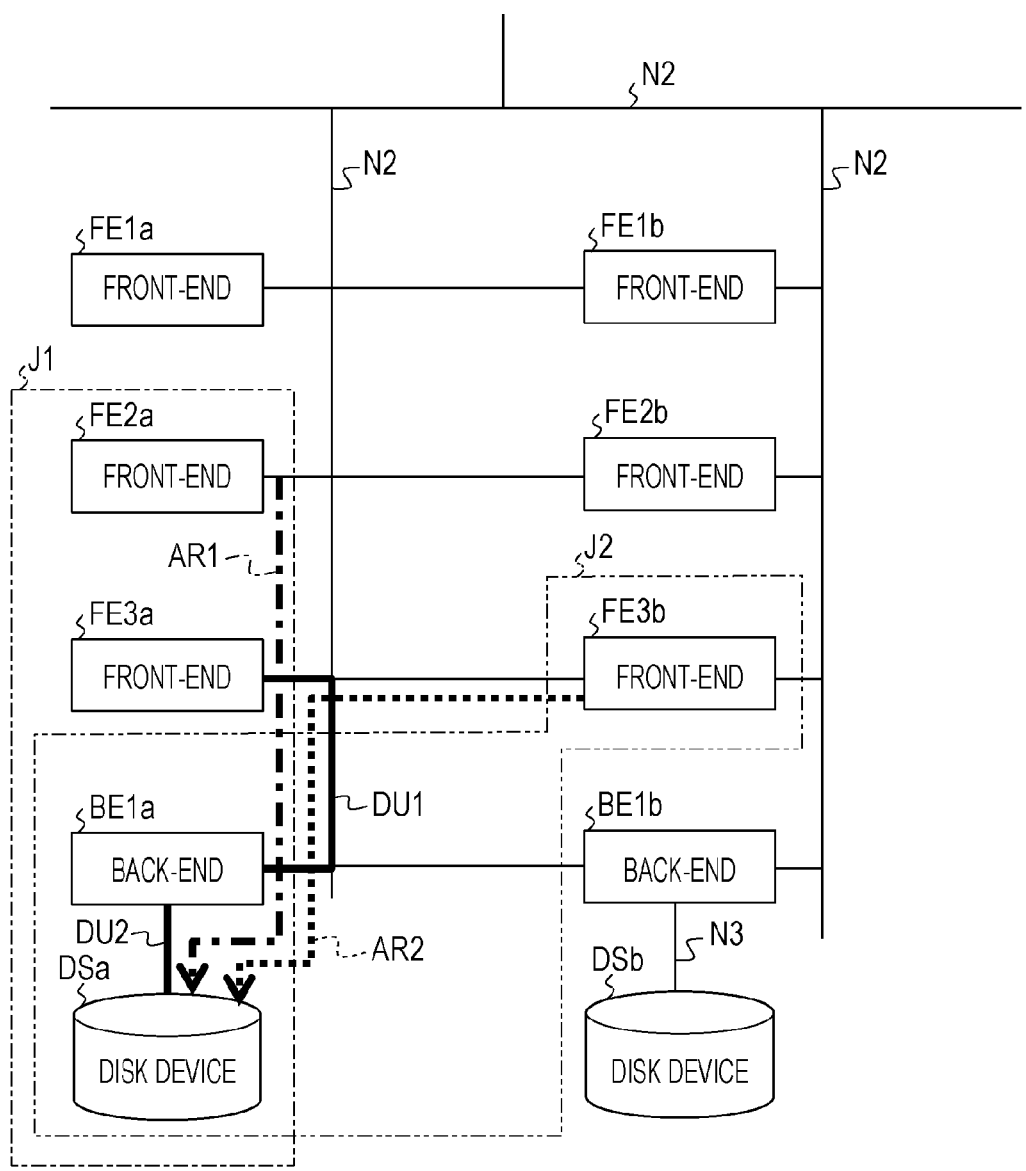
FIG. 16 is a first figure for illustrating optimization of an access path.
Figure 17:
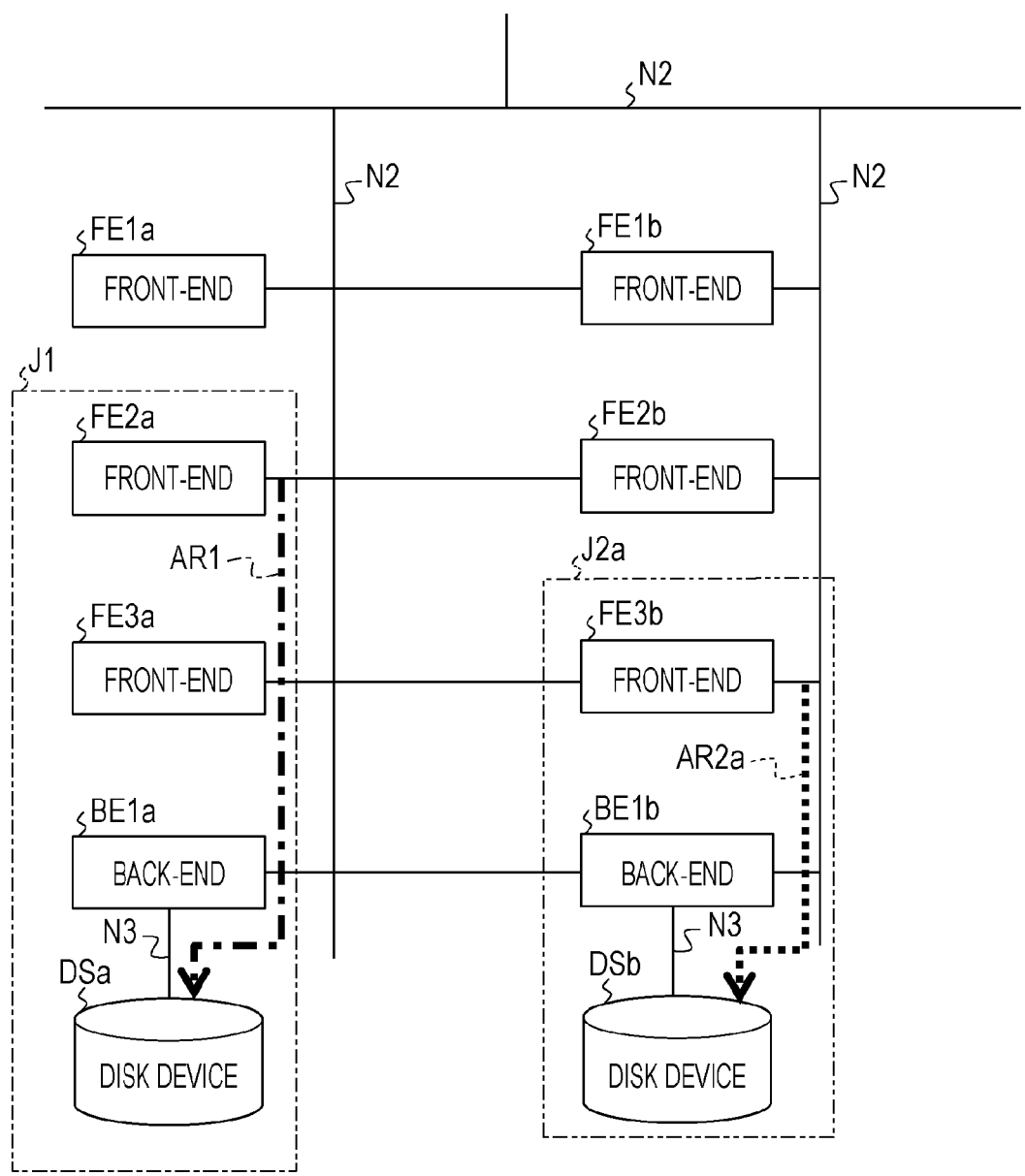
FIG. 17 is a second figure for illustrating optimization of the access path.

Based on the collected performance information, the recombination unit 13 executes optimization of the access path (S4). FIGS. 16 and 17 are first and second figures for illustrating optimization of the access path. FIGS. 16 and 17 illustrate the front-ends FE1$a$, FE2$a$, FE3$a$, FE1$b$, FE2$b$, FE3$b$, the back-ends BE1$a$, BE1$b$, and the disk devices DSa, DSb, that are extracted from FIG. 2.

As described in connection with the provisional allocation of the resource, resources of the first job are the front-ends FE2$a$, FE3$a$, the back-end BE1$a$, and the disk device DSa.

The front-end FE2$a$ executing the first job accesses to the disk device DSa via the front-end FE3$a$ and the back-end BE1$a$. The access to the disk device DSa by the front-end FE2$a$ is schematically indicated with a dashed dotted line arrow AR1 among the front-end FE2$a$, the front-end FE3$a$, the back-end BE1$a$, and the disk drive DSa.

The front-end FE3$a$ executing the first job accesses to the disk device DSa via the back-end BE1$a$. The access to the disk device DSa by the front-end FE3$a$ is schematically indicated with a dashed dotted line arrow AR1 among the front-end FE3$a$, the back-end BE1$a$, and the disk device DSa.

As described in connection with the provisional allocation of the resource, resources of the second job are the front-end FE3$b$, the back-end BE1$a$, and the disk device DSa.

Then, the front-end FE3$b$ executing the second job accesses to the disk device DSa via the front-end FE3$a$ and the back-end BE1$a$. The access to the disk device DSa by the front-end FE3$b$ is schematically indicated with a dotted line arrow AR2 among the front-end FE3$b$, the front-end FE3$a$, the back-end BE1$a$, and the disk drive DSa.

As described above, the allocation unit 12 determines a first path (see arrow AR2) including the front-end FE3$a$ that serves as a relay between the front-end FE3$b$ executing the second job and the first disk device DSa, and the back-end BE1$a$.

Here, an access path to the disk device DSa by the front-ends FE2$a$, FE3$a$ and an access path to the disk device DSa by the front-end FE3$b$ overlap with each other. The overlapping path includes two paths. A first overlapping path is a path DU1 between the front-end FE3$a$ and the back-end BE1$a$. A second overlapping path is a path DU2 between the back-end BE1$a$ and the disk device DSa.

In the overlapping path DU1, the write packets PW2$a$, PW3$a$, PW3$b$, read packets PR2$a$, PR3$a$, PR3$b$, and the result packet are transferred. This transfer causes a congestion (or crowd) of the network. As a result, the transfer efficiency of the front-ends FE3$b$, FE3$a$ drops. Increase of access processing (writing and reading of files) to the disk device DSa by the back-end BE1$a$ causes a congestion of networks in the overlapping path DU2. As a result, transfer efficiency of the back-end BE1$a$ drops. As described above, congestion of networks and increase of the processing load in the front-end, the back-end, and the disk device reduce access efficiency to the disk device DSa.

To solve the above problems, the recombination unit 13 executes optimization of the access path based on the performance information table T3 of FIG. 15 to suppress drop of the access efficiency, and further, to enhance the access efficiency (S4).

According to the performance information table T3 of FIG. 15, performance information of the back-end BE1b is 100 (MiB/S), and performance information of the back-end BE1a is 20 (MiB/S). As seen from the above, transfer efficiency of the back-end BE1b is high compared with transfer efficiency of the back-end BE1a. Then, the recombination unit 13 changes a disk device to which the front-end FE3b accesses, from the disk device DSa to the disk device DSb. This change enhances access efficiency to a disk device by the front-end FE3b.

That is, the recombination unit 13 recombines the back-end BE1a and the disk device DSa, that are part of resources of the second job, with the back-end BE1b and the disk device DSb (see reference sign J2a of FIG. 17).

In the recombination, the recombination unit 13 identifies a second path (see dotted line arrow AR2a of FIG. 17) including a second information processing device (for example, the back-end BE1b) that serves as a relay between the front-end FE3b executing the second job and the second disk device DSb. Specifically, based on the collected data transfer efficiency of each of the front-end and the back-end in the collected file system FSYS, the recombination unit 13 identifies a path having data transfer efficiency higher than data transfer efficiency in the first path as a second path enhancing access efficiency. For the first path, see arrow AR1 of FIG. 16. For the second path, see dotted arrow AR2a of FIG. 17.

When identifying the path, the recombination unit 13 identifies a second information processing device (for example, the back-end BE1b) having data transfer efficiency higher than data transfer efficiency of the first information processing device forming the first path. Then, based on the identified second information processing device, the recombination unit 13 identifies the second path. When identifying the second information processing device, the recombination unit 13 identifies the second information processing device such that the number of information processing devices between the front-end FE3b executing the second job and the second disk device DSb becomes minimum (that is, minimum number of pops).

Here, the recombination unit 13 newly creates second' execution information. The second' execution information includes IP addresses of the front-end FE3b and the recombined back-end BE1b, the IP address of the recombined disk device DSb, and second' path information indicating a path from the front-end FE3b to the back-end BE1b. The second' path information indicates that the second' access path across from the front-end FE3b to the disk device DSb which they are resources of the second job comprises the front-end FE3b and the back-end BE1b. That is, the front-end FE3b accesses to the disk device DSb via the back-end BE1b. The access to the disk device DSb by the front-end FE3b is schematically indicated with a dotted arrow AR2a (FIG. 17) among the front-end FE3b, the back-end BE1b, and the disk drive DSb.

The recombination unit 13 transmits the second' execution information to the front-end FE3b and the back-end BE1b.

The file access software SF2b of the front-end FE3b receives the second' execution information and stores into the RAM 203. The file access software SF3a of the back-end BE1b receives the second' execution information and stores into the RAM 303. Thereafter, the front-end FE3b accesses to the disk device DSb based on the execution information. Next, a specific example of this access is described.

(Write Request: Front-end FE3b)

The user software SF2a of the front-end FE3b executing the second job requests the file access software SF2b to write data created by execution of the job into a disk device. The interface unit 21 of the file access software SF2b receives this request. The file access software SF2b creates a write packet (hereinafter referred to as a write packet PW3b' as appropriate) with reference to the second' execution information.

The file access software SF2b of the front-end FE3b creates the following write packet PW3b'. The write packet PW3b' includes the IP address of the back-end BE1b as the IP address of the transfer destination, and the IP address of the front-end FE3b as the IP address of the transfer source. The write packet PW3b' includes "writing", file path to a written file, data for writing, and file name, as attributes of the access request.

The transmission-reception unit 22 of the front-end FE3b transmits the write packet PW3b' to a next front-end or back-end located closer to the disk device DSb in the second' access path. In the example of FIG. 2, the transmission-reception unit 22 of the front-end FE3b transmits the write packet PW3b' to the next back-end BE1b located closer to the disk device DSb in the second' access path.

Upon receiving the write packet PW3b', the transmission-reception unit 32 of the back-end BE1b outputs the write packet PW3b' to the file access unit 31 when the transfer destination IP address of the write packet PW3b' is the IP address of the back-end BE1b. When the attribute of the access request of the write packet PW3b' is "writing", the file access unit 31 writes data for writing included in the write packet PW3b' into the disk device DSb. In the writing, the file access unit 31 writes data for writing into a file designated with a file path and file name included in the write packet PW3b'.

The file access unit 31 creates a result packet indicating that writing of the file has succeeded or failed, and outputs to the transmission-reception unit 32. As described above, the result packet is transferred to the front-end FE3b in a path reverse to the write packet PW3b'. Description of processing of the user software SF2a after the result packet has been inputted in the front-end FE3b is omitted as described above.

(Read Request: Front-end FE3b)

The user software SF2a of the front-end FE3b executing the second job requests the file access software SF2b to read data from a disk device. The interface unit 21 of the file access software SF2b receives this request. The file access software SF2b creates a read packet (hereinafter referred to as a read packet PR3b' as appropriate) with reference to the second' execution information.

The second' execution information includes the second' path information. The file access software SF2b of the front-end FE3b creates the following read packet PR3b'. The read packet PR3b' includes the IP address of the back-end BE1b as the IP address of the transfer destination, and the IP address of the front-end FE3b as the IP address of the transfer source. The read packet PR3b' includes "reading", file path to a read file, and name of a file to be read, as attributes of the access request.

The transmission-reception unit 22 of the front-end FE3b transmits the read packet PR3b' to a next front-end or back-end located closer to the disk device DSb in the second' access path. In the example of FIG. 2, the transmission-reception unit 22 of the front-end FE3b transmits the read packet PR3b' to the next back-end BE1b located closer to the disk device DSb in the second' access path.

Upon receiving the read packet PR3b', the transmission-reception unit 32 of the back-end BE1b outputs the read packet PR3b' to the file access unit 31 when the transfer destination IP address of the read packet PR3b' is the IP address of the back-end BE1b. When the attribute of the access request of the read packet PR3b' is "reading", the file access unit 31 reads a file designated with a file path or file name contained in the read packet PR3b' from the disk device DSb.

The file access unit 31 creates a result packet including data of the read file and result information indicating that reading of the file has succeeded or failed, and outputs to the transmission-reception unit 32. As described above, the result packet is transferred to the front-end FE3b in a path reverse to the read packet PR3b'. Description of processing of the user software SF2a after the result packet has been inputted in the front-end FE3b is omitted as described above.

Before or after the change-over described above, the recombination unit 13 of the job manager MGR may store the file related to the second job stored in the disk device DSa before the change-over into the disk drive DSb after the change-over. Then, the recombination unit 13 notifies a file path of the file stored into the disk device DSb to the front-end FE3b. Thereafter, the front-end FE3b accesses to the file based on the notified file path.

If the access efficiency is not enhanced even after resources allocated to the job are recombined, the recombination unit 13 ends access path optimization processing without executing the resource recombination processing.

[Collection of Performance Information after Recombined]

If the processing does not end (S6: NO) after elapse of the first predetermined time (S5: YES) since the access path optimization has ended (S4 of FIG. 9), the job manager MGR collects performance information from the front-end FE and the back-end BE. Then, the job manager MGR stores collected performance information into the performance information storage region IF1 of the storage 102 of FIG. 3 (S3).

FIG. 18 is a table for storing performance information collected after resources have been recombined by optimizing the access path. A performance information table T4 of the job manager MGR illustrated in FIG. 16 is stored in the performance information storage region IF1 of the storage 102.

According to a line LN3 of FIG. 18, performance information of the front-end FE3a being a resource of the first job is "80 (MiB/S)", and according to a line LN2 of FIG. 18, performance information of the back-end BE1a being a resource of the first job is "80 (MiB/S)". Before recombination of resources, performance information of the front-end FE3a and the back-end BE1a is "20 (MiB/S)" according to FIG. 15.

Thus, recombination of resources enhances the transfer efficiency of the front-end FE3a and the back-end BE1a from 20 (MiB/S) to 80 (MiB/S). That is, recombination of resources enhances the transfer efficiency of the front-end FE3a and the back-end BE1a by 4 (80/20) times.

This enhancement of the transfer efficiency owes to reduction of the data transfer amount in paths DU1 and DU2 of FIG. 16 resulting from stoppage of data transfer between the front-end FE3b and the front-end FE3a by resource recombination. This reduction alleviates congestion of networks in paths DU1 and DU2 of FIG. 16.

According to a line LN4 of FIG. 18, performance information of the front-end FE3b being a resource of the second job is "100 (MiB/S)", and according to a line LN5 of FIG. 18, performance information of the back-end BE1b being a resource of the second job is "100 (MiB/S)". Before recombination of resources, performance information of the front-end FE3b is "20 (MiB/S)" according to FIG. 15.

Thus, recombination of resources enhances the transfer efficiency of the front-end FE3b from 20 (MiB/S) to 100 (MiB/S). That is, recombination of resources enhances the transfer efficiency of the front-end FE3b by 5 (100/20) times.

This enhancement of the transfer efficiency owes to the following reason: That is, after recombination of resources, data transfer by file access is not executed in the network N2 between the front-end FE3b and the back-end BE1b, and in the network N3 between the back-end BE1b and the disk device DSb. For this reason, bandwidth of the network is not pressed. By the enhancement of transfer efficiency, accessible data amount of the disk device DSb becomes larger than accessible data amount of the disk device DSa even when a file access speed of the disk device DSb is lower than a file access speed of the disk device DSa. In this case, accessible data amount of the disk device is data amount accessible by a disk device per unit time.

As described above, the file system according to this embodiment is capable of achieving the following states by optimizing the access path. That is, a state wherein file access efficiency is enhanced (or improved) not only when a second job is executed, but also when a first job is executed (Pareto improvement). Consequently, the file system according to this embodiment is capable of executing optimization so as to enhance throughput of the entire file system FSYS. Then, the file system according to this embodiment repeats optimization of the access path (Pareto optimization) until enhancement of the access efficiency during job execution may not be expected.

Since an optimum resource is capable of being allocated to a high priority job by enhancing efficiency of the access path, time for completing a high priority job may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. A file system comprising:
   a plurality of information processing devices; and
   a management device,
   the plurality of information processing devices and the management device being coupled to a communications network, wherein
   each information processing device of the plurality of information processing devices includes:
      a first memory;
      a storage device,
      a back-end device operable to access the storage device,
      at least one front-end device operable to:
         receive a request to execute jobs from an external device,
         execute the jobs requested to be executed by the received request, and
         communicate with the back-end device to access the storage device to store data corresponding to the jobs, and at least one first processor, coupled to the first memory, operable to transmit state information indicating utilization state of the communications network by the information processing device to the management device, and the management device includes:
a second memory, and
at least one second processor, coupled to the second memory, operable to:
determine a specified front-end device to execute a job, from among a plurality of front-end devices included in the plurality of information processing devices,
determine a first storage device to be accessed by execution of the job from among a plurality of storage devices included in the plurality of information processing devices,
determine a first path in the communications network between the determined front-end device and the first storage device through the back-end device of the information processing device that includes the first storage device,
collect the state information,
identify, based on the collected state information, a second storage device from among the plurality of storage devices, the second storage device being a storage device of which data transfer rate by the determined front-end device in the execution of the job is higher than the first storage device,
identify a second path in the communications network between the determined front-end device and the second storage device through the back-end device of the information processing device that includes the second storage device, and
cause the second path including the second storage device to be used for the execution of the job by the determined front-end device,
the determined first path includes a first front-end device of the information processing device that includes the first storage device, the first front-end device relaying data transmitted from the specified front-end device to the first storage device,
the identified second path includes a second front-end device of the information processing device that includes the second storage device, the second front-end device relaying data transmitted from the specified front-end device to the second storage device,
the state information transmitted by each of the plurality of information processing devices indicates a data transfer rate for the at least one front-end device of each of the plurality of information processing devices to transfer data to the communications network, and
the identifying the second path identifies, based on the data transfer rate indicated by the state information of information processing devices collected by the management device, the second path having a data transfer rate higher than a data transfer rate in the first path.

2. The file system according to claim 1, wherein the state information indicates data transfer rate for transferring data by each of a plurality of back-end devices included in the plurality of information processing devices.

3. A non-transitory computer-readable storage media storing a control program of a management device coupled to a communications network and that manages a file system including a plurality of information processing devices coupled to the communications network, each information processing device of the plurality of information processing devices including a first memory, a storage device, a back-end device operable to access the storage device, at least one front-end device operable to receive a request to execute jobs from an external device, execute the jobs requested to be executed by the received request, and communicate with the back-end device to access the storage device to store data corresponding to the jobs, and at least one first processor, coupled to the first memory, operable to transmit state information indicating utilization state of the communications network by the information processing device to the management device, and the management device includes a second memory and at least one second processor coupled to the second memory, the control program executable by the at least one second processor to cause the management device to:
determine a specified front-end device to execute a job, from among the plurality of front-end devices included in the plurality of information processing devices,
determine a first storage device to be accessed by execution of the job from among a plurality of storage devices included in the plurality of information processing devices,
determine a first path in the communications network between the determined front-end device and the first storage device through the back-end device of the information processing device that includes the first storage device,
collect the state information,
identify, based on the collected state information, a second storage device from among the plurality of storage devices, the second storage device being a storage device of which data transfer rate by the determined front-end device in the executing of the job is higher than the first storage device,
identifying a second path in the communications network between the determined front-end device and the second storage device through the back-end device of the information processing device that includes the second storage device, and
cause the second path including the second storage device to be used for the execution of the job by the determined front-end device, wherein
the determined first path includes a first front-end device of the information processing device that includes the first storage device, the first front-end device relaying data transmitted from the specified front-end device to the first storage device,
the identified second path includes a second front-end device of the information processing device that includes the second storage device, the second front-end device relaying data transmitted from the specified front-end device to the second storage device,
the state information transmitted by each of the plurality of information processing devices indicates a data transfer rate for the at least one front-end device of each of the plurality of information processing devices to transfer data to the communications network, and
the identifying the second path identifies, based on the data transfer rate indicated by the state information of information processing devices collected by the management device, the second path having a data transfer rate higher than a data transfer rate in the first path.

4. A method of controlling a file system including a plurality of information processing devices and a management device coupled to a communications network, each information processing device of the plurality of information processing devices including a first memory, a storage device, a back-end device operable to access the storage device, at least one front-end device operable to receive a request to execute jobs from an external device, execute the jobs requested to be executed by the received request, and communicate with the back-end device to access the storage device to store data corresponding to the jobs, and at least one first processor, coupled to the first memory, operable to transmit state information indicating utilization state of the communications network by the information processing device to the management device, and the management device includes a second memory and at least one second processor coupled to the second memory, the method comprising:
  causing each of the plurality of information processing devices to transmit the state information to the management device; and
  causing the management device to
    determine a specified front-end device to execute a job, from among a plurality of front-end devices included in the plurality of information processing devices,
    determine a first storage device to be accessed by execution of the job from among a plurality of storage devices included in the plurality of information processing devices,
    determine a first path in the communications network between the determined front-end device and the first storage device through the back-end device of the information processing device that includes the first storage device,
    collect the state information,
    identify, based on the collected state information, a second storage device from among the plurality of storage devices, the second storage device being a storage device of which data transfer rate by the determined front-end device in the executing of the job is higher than the first storage device,
    identify a second path in the communications network between the determined front-end device and the second storage device through the back-end device of the information processing device that includes the second storage device, and
    cause the second path including the second storage device to be used for the execution of the job by the determined front-end device, wherein
  the determined first path includes a first front-end device of the information processing device that includes the first storage device, the first front-end device relaying data transmitted from the specified front-end device to the first storage device,
  the identified second path includes a second front-end device of the information processing device that includes the second storage device, the second front-end device relaying data transmitted from the specified front-end device to the second storage device,
  the state information transmitted by each of the plurality of information processing devices indicates a data transfer rate for the at least one front-end device of each of the plurality of information processing devices to transfer data to the communications network, and
  the identifying the second path identifies, based on the data transfer rate indicated by the state information of information processing devices collected by the management device, the second path having a data transfer rate higher than a data transfer rate in the first path.

* * * * *